(12) United States Patent
Davulcu et al.

(10) Patent No.: US 10,599,700 B2
(45) Date of Patent: Mar. 24, 2020

(54) SYSTEMS AND METHODS FOR NARRATIVE DETECTION AND FRAME DETECTION USING GENERALIZED CONCEPTS AND RELATIONS

(71) Applicants: Hasan Davulcu, Phoenix, AZ (US); Steven Corman, Chandler, AZ (US)

(72) Inventors: Hasan Davulcu, Phoenix, AZ (US); Steven Corman, Chandler, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 762 days.

(21) Appl. No.: 15/244,226

(22) Filed: Aug. 23, 2016

(65) Prior Publication Data

US 2017/0116204 A1    Apr. 27, 2017

Related U.S. Application Data

(60) Provisional application No. 62/208,966, filed on Aug. 24, 2015.

(51) Int. Cl.
*G06F 16/35* (2019.01)
*G06F 17/27* (2006.01)

(52) U.S. Cl.
CPC ........ *G06F 16/355* (2019.01); *G06F 17/2785* (2013.01); *G06F 17/2795* (2013.01)

(58) Field of Classification Search
CPC ........... G06F 17/3071; G06F 17/30619; G06F 17/271; G06F 17/2785; G06F 17/241; G06F 17/2735; G06F 17/274

USPC ....................................................... 707/737
See application file for complete search history.

(56) References Cited

U.S. PATENT DOCUMENTS

| | | | |
|---|---|---|---|
| 7,478,089 B2 | 1/2009 | Henkin et al. | |
| 8,458,105 B2 | 6/2013 | Nolan et al. | |
| 8,909,643 B2* | 12/2014 | Ankan | G06F 16/316 707/737 |
| 9,524,464 B2 | 12/2016 | Davulcu et al. | |
| 2010/0235314 A1 | 9/2010 | Nolan et al. | |

(Continued)

OTHER PUBLICATIONS

Ceran et al., "A Semantic Triplet Based Story Classifier", Aug. 26-29, 2012, IEEE/ACM International Conference on Advances in Social Networks Analysis and Mining (Year: 2012)*

(Continued)

*Primary Examiner* — Hosain T Alam
*Assistant Examiner* — Robert F May
(74) *Attorney, Agent, or Firm* — Snell & Wilmer L.L.P.

(57) ABSTRACT

Co-clustering based on generalized conceptual relationships can automatically detect story forms incorporating archetypes/targets and actions. Co-clustering can help in identifying similarities that exist in low-dimensional sub-spaces of sparse data such as textual paragraphs. Through co-clustering, the clusters themselves and their characteristic features are identifiable which can be useful in describing and summarizing their contents. The residual error of factorization with concept-based features is significantly lower than the error with prior keyword-based features. Qualitative evaluations also suggest that concept-based features yield more coherent, distinctive and interesting story forms compared to those produced by using prior keyword-based features.

15 Claims, 16 Drawing Sheets

(56) References Cited

U.S. PATENT DOCUMENTS

| | | | |
|---|---|---|---|
| 2011/0219000 A1* | 9/2011 | Kusumura | G06F 16/3346 707/737 |
| 2011/0256515 A1 | 10/2011 | Miller et al. | |
| 2011/0307485 A1* | 12/2011 | Udupa | G06F 16/367 707/737 |
| 2012/0130771 A1 | 5/2012 | Kannan et al. | |
| 2013/0080434 A1 | 3/2013 | Subasic et al. | |
| 2015/0052074 A1* | 2/2015 | Reynolds | G06Q 50/265 705/325 |
| 2015/0378986 A1* | 12/2015 | Amin | G06F 17/24 704/9 |
| 2016/0188566 A1* | 6/2016 | Jifroodian-Haghighi | G09B 5/02 704/10 |
| 2017/0032781 A1* | 2/2017 | Sharifi | G10L 15/197 |

OTHER PUBLICATIONS

Ceran et al., "A Semantic Triplet Based Story Classifier", Aug. 26-29, 2012, IEEE/ACM International Conference on Advances in Social Networks Analysis and Mining (Year: 2012).*

Li et al. "A Non-negative Matrix Tri-factorization Approach to Sentiment Classification with Lexical Prior Knowledge", Aug. 2-7, 2009, ACL '09 Proceedings of the Joint Conference of the 47th Annual Meeting of the ACL (Year: 2009).*

Zhang et al. "Localized Matrix Factorization for Recommendation based on Matrix Block Diagonal Forms", May 13-17, 2013, WWW '13 Proceedings of the 22nd international conference on World Wide Web pp. 1511-1520. (Year: 2013).*

J. Kang, et al., "GigaTensor: Scaling Tensor Analysis up by 100 times—Algorithms and Discoveries," in Proceedings of the 18th ACM SIGKDD International Conference on Knowledge Discovery and Data Mining, ACM, pp. 316-324, 2012.

S. Kok, et al., "Extracting Semantic Networks from Text via Relational Clustering," in Proceedings of the 2008 European Conference on Machine Learning and Knowledge Discovery in Databases—Part I, pp. 624-639, 2008.

B. Ceran, et al., "A Semantic Triplet Based Story Classifier," 2012 IEEE/ACM International Conference on Advances in Social Networks Analysis and Mining (ASONAM 2012), vol. 0, pp. 573-580, 2012.

J. Allan, et al., "First Story Detection in TDT is Hard," in Proceedings of the Ninth International Conference on Information and Knowledge Management, ser. CIKM '00, pp. 374-381, 2000.

T. Hasegawa, et al., "Discovering Relations Among Named Entities from Large Corpora," in Proceedings of the 42nd Annual Meeting on Association for Computational Linguistics, ser. ACL '04, 2004.

M. Banko, et al., "Strategies for Lifelong Knowledge Extraction from the Web," in Proceedings of the 4th International Conference on Knowledge Capture, ser. K-CAP '07, pp. 95-102, 2007.

B. Min, et al., "Ensemble Semantics for Large-Scale Unsupervised Relation Extraction," in Proceedings of the 2012 Joint Conference on Empirical Methods in Natural Language Processing and Computational Natural Language Learning, Association for Computational Linguistics, pp. 1027-1037, 2012.

A. S. Gordon, et al., "Automated Story Capture from Conversational Speech," in K-CAP '05: Proceedings of the 3rd International Conference on Knowledge Capture, pp. 145-152, 2005.

A. Gordon, et al., "Automated Story Capture from Internet Weblogs," in K-CAP '07: Proceedings of the 4th International Conference on Knowledge Capture, pp. 167-168, 2007.

A- Gordon, et al., "Identifying Personal Stories in Millions of Weblog Entries," in Third International Conference on Weblogs and Social Media, Data Challenge Workshop, 2009.

K. Raghunathan, et al., "A Multi-Pass Sieve for Coreference Resolution," in Proceedings of the 2010 Conference on Empirical Methods in Natural Language Processing, Association for Computational Linguistics, pp. 492-501, 2010.

H. Lee, et al., "Stanfords Multi-Pass Sieve Coreference Resolution System at the CoNLL-2011 Shared Task," CoNLL 2011, pp. 28-34, 2011.

H. Lee, et al., "Deterministic Coreference Resolution Based on Entity-Centric, Precision-Ranked Rules," Computational Linguistics, vol. 39, No. 4, pp. 885-916, Dec. 2013.

M. Recasens, et al., "The Life and Death of Discourse Entities: Identifying Singleton Mentions," in Proceedings of the 2013 Conference of the North American Chapter of the Association for Computational Linguistics: Human Language Technologies, pp. 627-633, 2013.

J. D. Choi, "Optimization of Natural Language Processing Components for Robustness and Scalability," Computer Science Graduate Theses and Dissertations, University of Colorado at Boulder, 2012.

N. Ide, et al., "Word Sense Disambiguation: The State of the Art," Computational Linguistics, vol. 24, pp. 2-40, 1998.

C. Chang, et al., "LIBSVM: a Library for Support Vector Machines," ACM Transactions on Intelligent Systems and Technology (TIST), vol. 2, No. 3, p. 27, 2011.

J. Liu, et al., "Large-Scale Sparse Logistic Regression," in Proceedings of the 15th ACM SIGKDD International Conference on Knowledge Discovery and Data Mining, ACM, pp. 547-556, 2009.

J. Liu, et al., "SLEP: Sparse Learning with Efficient Projections," Arizona State University, [Online], Available: http://www.public.asu.edu/_jye02/Software/SLEP, 2009.

R. Hoffman, et al., "Using Computational Patients to Evaluate Illness Mechanisms in Schizophrenia," Biological Psychiatry, 69, pp. 997-1005, 2011.

B. Masand, et al., "Classifying News Stories Using Memory Based Reasoning," in Proceedings of the 15th Annual International ACM SIGIR Conference on Research and Development in Information Retrieval, ACM, pp. 59-65, 1992.

D. Billsus, et al., "A Hybrid User Model for News Story Classification," Lectures-International Centre for Mechanical Sciences, pp. 99-108, 1999.

D. Rusu, et al., "Triplet Extraction from Sentences," Proceedings of the 10th International Multiconference Information Society-IS, pp. 8-12, 2007.

D. Hooge Jr, "Extraction and Indexing of Triplet-based Knowledge Using Natural Language Processing," Master of Science Theses, University of Georgia, 2007.

S. Jonnalagadda, "An Effective Approach to Biomedical Information Extraction with Limited Training Data," Doctor of Philosophy dissertation, Arizona State University, 2011.

P. Vaz, et al., "Using Unsupervised Word Sense Disambiguation to Guess Verb Subjects on Untagged Corpora", Language Forum, vol. 34, No. 1, Jan.-Jun. 2008.

T. Pedersen, "Improved Unsupervised Name Discrimination with Very Wide Bigrams and Automatic Cluster Stopping", in Proceedings of the 10th International Conference on Computational Linguistics and Intelligent Text Processing (CICLing '09), pp. 294-305, 2009.

B. Ceran, et al., "Story Detection Using Generalized Concepts and Relations," 2015 IEEE/ACM International Conference on Advances in Social Networks Analysis and Mining (ASONAM), pp. 942-949, Aug. 2015.

N. Kedia, "Story Detection Using Generalized Concepts," Masters of Sciences Thesis, Arizona State University, May 2015.

G. Goertz, et al., "Two-Level Theories and Fuzzy-Set Analysis," Sociological Methods & Research, vol. 33, Issue 4, pp. 497-538, 2005.

H. Davulcu, et al., "Analyzing Sentiment Markers Describing Radical and Counter-Radical Elements in Online News," IEEE International Conference on Social Computing, pp. 335-340, Aug. 20-22, 2010.

S. Tikves, et al., "A System for Ranking Organizations using Social Scale Analysis," Social Network Analysis and Mining, vol. 3, Issue 3, pp. 313-328, 2013, first online May 30, 2012.

S. Tikves, et al., "Perspective Analysis for Online Debates," International Conference on Advances in Social Networks Analysis and Mining, pp. 898-905, Aug. 26-29, 2012.

(56) References Cited

OTHER PUBLICATIONS

S. Van't Klooster, et al., "Practising the Scenario-Axes Technique," Futures, vol. 38, Issue 1, pp. 15-30, 2006.
A. Wallace, et al., "Revitalization Movements," American Anthropologist, vol. 58, Issue 2, pp. 264-281, 1956.
J. Githens-Mazer, et al., "The Rhetoric and Reality: Radicalization and Political Discourse," International Political Science Review, vol. 33, Issue 5, pp. 556-567, 2012.
J. Githens-Mazer, et al., "Rethinking the Causal Concept of Islamic Radicalization," Political Concepts: Committee on Concepts and Methods Working Paper Series, vol. 42, pp. 3-32, 2010.
L. Alsumait, et al., "On-line LDA: Adaptive Topic Models for Mining Text Streams with Applications to Topic Detection and Tracking," in Eighth IEEE International Conference on Data Mining (ICDM '08), pp. 3-12, 2008.
M. Yuan, et al., "Model Selection and Estimation in the Gaussian Graphical Model," Biometrika, vol. 94, No. 1, pp. 19-35, 2007.
J. Friedman, et al., "Sparse Inverse Covariance Estimation with the Graphical Lasso," Biostatistics, vol. 9, No. 3, pp. 432-441, 2008.
R. MacCallum, et al., "Applications of Structural Equation Modeling in Psychological Research," Annual Review of Psychology, vol. 51, pp. 201-226, 2000.
R. Tibshirani, et al., "Regression Shrinkage and Selection Via the Lasso," Journal of the Royal Statistical Society Series B, vol. 58, No. 1, pp. 267-288, 1996.
J. Goldenberg, et al., "Talk of the Network: A Complex Systems Look at the Underlying Process of Word-of-Mouth," Marketing Letters, vol. 12, No. 3, pp. 211-223, 2001.
D. Gruhl, et al., "Information Diffusion Through Blogspace," in Proceedings of the 13th International Conference on World Wide Web (WWW '04), pp. 491-501, 2004.
P. Berger, et al., "The Sociological Study of Sectarianism," Social Research, vol. 51, Issue 1-2, pp. 367-385, 1984.
H. Akaike, et al., "A New Look at the Statistical Model Identification," IEEE Transactions on Automatic Control, vol. 19, No. 6, pp. 716-723, 1974.
S. Wallace, et al., "Contextual Intelligence & Advanced Analytics for Telecommunications," Heavy Reading, Jun. 2012.
N. Banerjee, et al., "Contextual Analysis of User Interests in Social Media Sites—An Exploration with Micro-blogs," IBM Research Report, Aug. 10, 2009.

\* cited by examiner

1: CALCULATE CONTEXTUAL SIMILARITY($\mathcal{C}^0$)
2:     $S_\mathcal{S}, S_\mathcal{V}, S_\mathcal{O} \leftarrow 0$
3:     for all $c \in \mathcal{C}^0$ do
4:         if $c = \langle S, v, o \rangle$ then
5:             $S_\mathcal{S}(i,j) \leftarrow S_\mathcal{S}(i,j) + 1, \forall s_i, s_j \in S$.
6:         else if $c = \langle s, V, o \rangle$ then
7:             $S_\mathcal{V}(i,j) \leftarrow S_\mathcal{V}(i,j) + 1, \forall v_i, v_j \in V$.
8:         else if $c = \langle s, v, O \rangle$ then
9:             $S_\mathcal{O}(i,j) \leftarrow S_\mathcal{O}(i,j) + 1, \forall o_i, o_j \in O$.
10:         end if
11:     end for
12: end

FIG. 1C

SYSTEMS AND METHODS FOR NARRATIVE DETECTION AND FRAME DETECTION USING GENERALIZED CONCEPTS AND RELATIONS

CROSS-REFERENCE TO RELATED APPLICATIONS

This application claims priority to, and the benefit of, U.S. Provisional Application Ser. No. 62/208,966 filed on Aug. 24, 2015 and entitled "SYSTEMS AND METHODS FOR STORY DETECTION USING GENERALIZED CONCEPTS AND RELATIONS". The foregoing application is hereby incorporated by reference in its entirety for all purposes.

FEDERALLY SPONSORED RESEARCH OR DEVELOPMENT

This invention was made with government support under grant number N00014-09-1-0872 awarded by the Office of Naval Research. The Government has certain rights in the invention.

TECHNICAL FIELD

The present disclosure relates to communications, and in particular to narrative analysis of communications.

BACKGROUND

A major challenge facing automated discourse analysis is that word usage can differ between two texts even though they are talking about the same thing. For example, violent extremists may use words such as "brothers", "mujahidin", "mujahedeen" and even "lions of Islam" to refer to the same group of people. Analyzing text at the surface level would treat related concepts (i.e. actors, actions, targets, and victims) as different objects, potentially missing common narrative patterns. Accordingly, improved systems, methods, and frameworks for narrative detection and analysis are desirable.

BRIEF DESCRIPTION OF THE DRAWINGS

With reference to the following description and accompanying drawings:

FIG. 1C illustrates an exemplary algorithm for calculating contextual similarity in accordance with an exemplary embodiment;

DETAILED DESCRIPTION

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for textual assessment, story detection, and/or the like may not be described in detail herein. Furthermore, the connecting lines shown in various figures contained herein are intended to represent exemplary functional relationships and/or physical or communicative couplings between various elements. It should be noted that many alternative or additional functional relationships may be present in a practical narrative detection system.

Exemplary systems herein may be implemented as software code operative on customized computing hardware, for example a field-programmable gate array (FPGA) customized to form hardware optimized to implement various algorithms of the present disclosure. Accordingly, the exemplary systems and methods disclosed herein may improve the operating of a computer by offering more efficient calculation of desired information (thus saving time and electricity) and/or more accurate results (thus eliminating the need for further and/or unnecessary additional computation and evaluation). Additionally, principles of the present disclosure offer improvement in various other technical fields, including but not limited to counterterrorism, by providing improved recognition of extremist narratives and thus the ability to countermessage and/or mitigate the impact of such narratives. Moreover, it will be appreciated that the machine-learning algorithms and classifiers disclosed herein are necessarily rooted in computer technology and could not be performed on pen and paper or as mental exercises.

A major challenge facing automated discourse analysis is that word usage can differ between two texts even though they are talking about the same thing. For example, violent extremists may use words such as "brothers", "mujahidin", "mujahedeen" and even "lions of Islam" to refer to the same group of people. Analyzing text at the surface level would treat related concepts (i.e. actors, actions, targets, and victims) as different objects, potentially missing common narrative patterns. Principles of the present disclosure address this problem by discovering "contextual synonyms", which are verb and noun phrases that occur in similar contexts. After the exemplary systems and methods disclosed herein reveal contextual similarity, such references can be generalized to a common node in a semantic network.

Figure 1A:
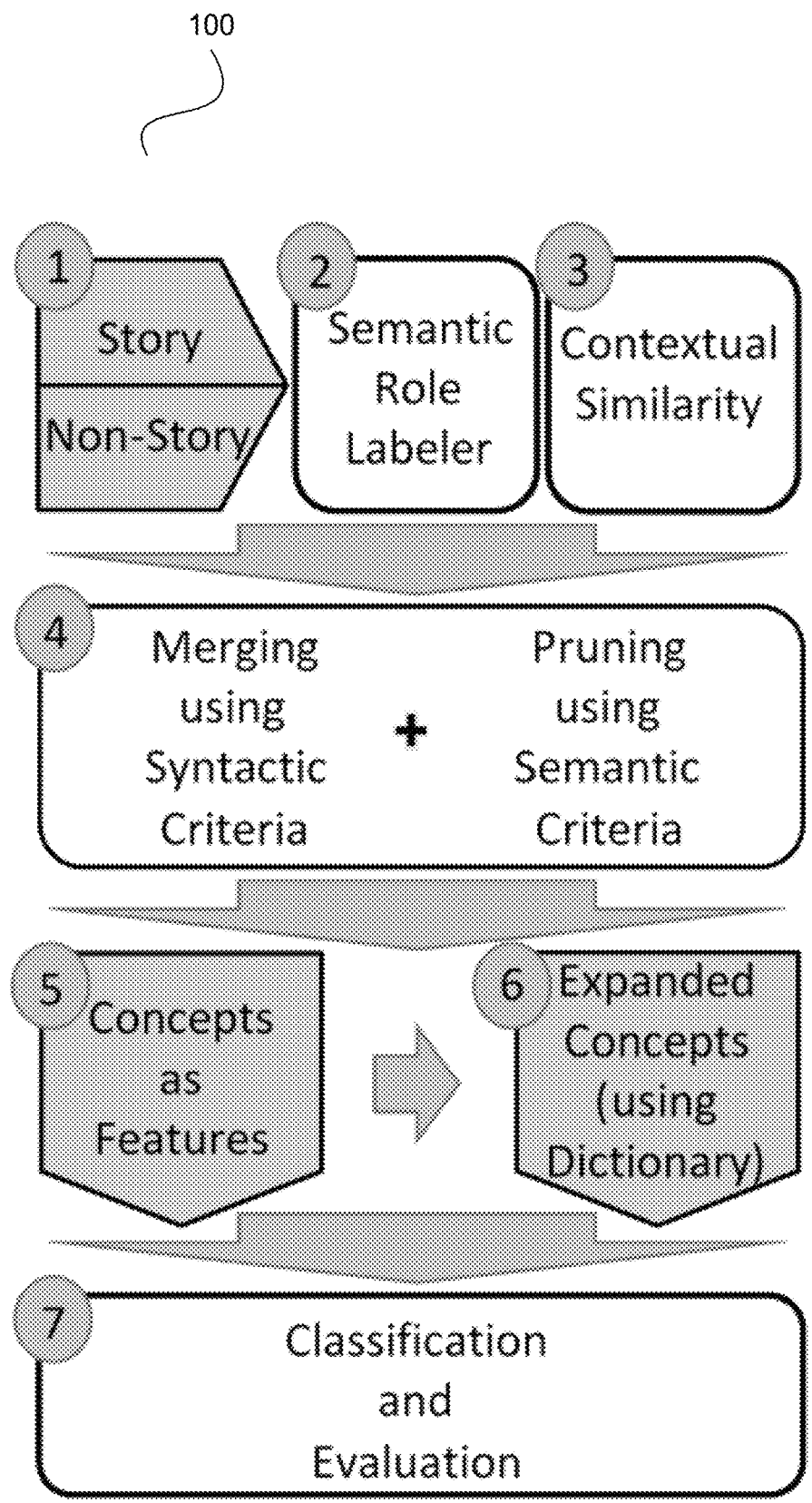
FIG. 1A illustrates an architecture for an exemplary system for narrative detection in accordance with an exemplary embodiment.
Figure 1B:
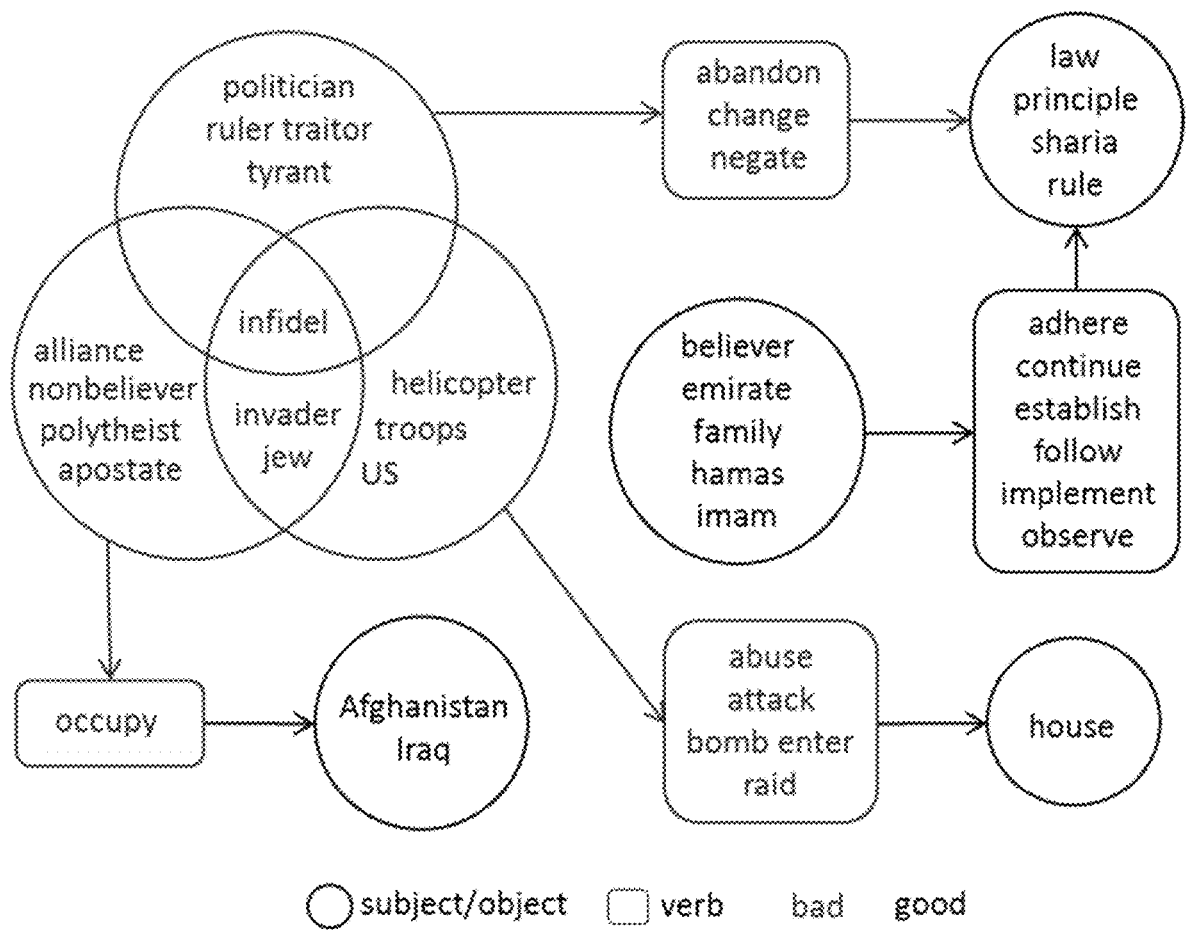
FIG. 1B illustrates an exemplary semantic network in accordance with an exemplary embodiment.

With reference now to FIGS. 1A and 1B, in various exemplary embodiments an exemplary narrative detection system and method 100 utilizes an unsupervised and domain-independent framework which extracts high-level information from text as relationships and concepts forming a semantic network. Exemplary systems and methods first use a semantic role labeler to obtain ground facts as semantic triplets from text, and then proceed to generalize them through a bottom-up agglomerative clustering algorithm. Semantic role labeling, i.e. shallow semantic parsing, is a task in natural language processing which recognizes the predicate or verb phrases in a sentence along with its semantic arguments and classifies them into their specific roles as subjects and objects.

For example, exemplary systems and methods are operative to merge extracted triplets such as (mujahidin→kill→kafir) and (ISIS→demolish→shrines) into high level generalized concepts and relations, such as {ISIS, mujahidin}→{kill, demolish} →{kafir, shrines} by discovering contextual synonyms such as {ISIS, mujahidin}, {kafir, shrines} and {kill, demolish}.

As used herein, "contextual synonyms" are not synonyms in the traditional dictionary sense, but they are phrases that may occur in similar semantic roles and associated with similar contexts. In contrast to prior approaches, the systems and methods disclosed herein utilize both syntactic and semantic corpus-based merging criteria. A pair of Subject, Verb, Object triplets is merged if (i) they share a common context among their corresponding terms (i.e. syntactic criteria) and (ii) they satisfy corpus-based support and similarity measure thresholds (i.e. semantic criteria). A corpus-based measure of "contextual synonymy" is defined based on their shared contexts of subjects, verbs and objects.

Syntactic Criteria. One of the major challenges in obtaining information via generalization is to maintain meaningful concepts as they grow. Exemplary systems and methods address this problem by merging concepts only if they have a common context in all three semantic arguments (i.e., subject, verb, object). Given a generalized concept, $(\{s_1, s_2, \ldots\}, \{v_1, v_2, \ldots\}, \{o_1, o_2, \ldots\}) \in C$, exemplary approaches maintain that all subjects ($s_i$), verbs ($v_j$) and objects ($o_k$) are "contextually synonymous" among themselves and can be used interchangeably to generate meaningful triplets. Let $c_1=(\{s_1, s_2\}, v_1, o_1)$ and $c_2=(s_1, v_1, \{o_1, o_2\})$ be two concepts with unique pairs, i.e. $c_1, c_2 \in C^0$. Consider merging these concepts into a more generalized concept $c_3=(\{s_1, s_2\}, v_1, \{o_1, o_2\})$. Since $c_3$ adds a new object, $o_2$, to $c_1$, an exemplary method requires that $c_1$ and $c_2$ have a common context in order to justify the merge, i.e. the intersection of $c_1$ and $c_2$'s subject and verb sets, $\{s_i\}$ and $\{v_i\}$, should be non-empty. Similarly, since we are adding a new subject, $s_2$, to $c_2$'s subject set, an exemplary method also requires that the intersection of $c_1$ and $c_2$'s verb and object sets, $\{v_1\}$ and $\{o_1\}$, should be non-empty as well. Since these conditions are satisfied in this case, we can merge $c_1$ and $c_2$ into the same concept provided they satisfy the semantic criteria discussed below.

On the other hand, let us consider $c_1=(\{s_1, s_2\}, v_1, o_1)$ and $c_2=\{v_1, v_2\}, o_2)$. If we merge these concepts, the new concept will be $c_3=(\{s_1, s_2\}, \{v_1, v_2\}, \{o_1, o_2\})$. Since $c_3$ adds a new object, $o_2$, to $c_1$, an exemplary method requires that the intersection of $c_1$ and $c_2$'s subject and verb sets, $\{s_1\}$ and $\{v_1\}$, should be non-empty, which is the case. $c_3$ would also add a new verb, $v_2$, to $c_1$, hence an exemplary method requires that the intersection of $c_1$ and $c_2$'s subject and object sets should be non-empty as well, which is not the case. There is a common subject but objects are totally distinct. Therefore, operation of an exemplary method should not merge these concepts into the same one since there is not enough common context to justify the merged concept. In various exemplary embodiments, these conditions may be expressed in a more formal way, as follows.

Let C1=(S1, V1, O1) and C2=(S2, V2, O2) be two concepts. In an exemplary method, C1 and C2 may be merged if they meet all of the following conditions:
$S_1/=S_2 \Rightarrow \{V_1 \cap V_2/=\emptyset$ and $O_1 \cap O_2/=\emptyset\}$,
$V_1/=V_2 \Rightarrow \{S_1 \cap S_2/=\emptyset$ and $O_1 \cap O_2/=\emptyset\}$, and
$O_1/=O_2 \Rightarrow \{S_1 \cap S_2/=\emptyset$ and $V_1 \cap V2 /=\emptyset\}$.

Semantic Criteria. While the syntactic criteria ensure inter-relatedness of distinct members of concepts to their contexts, exemplary systems also utilize a secondary measure to establish intra-relatedness between the distinct members of concepts in each argument position. The system may utilize a contextual similarity measure that relates subjects, verbs, and objects among themselves. The semantic test requires that only the most similar candidate keywords can be added to a concept. The system may use these criteria to grow the concepts without drift. In one exemplary embodiment, the semantic criteria may be presented as follows:

Let $C_1 (S_1, V_1, O_1)$ and $C_2=(S_2, V_2, O_2)$ be two concepts which passes the syntactic criteria and let $C_3$ be the new concept after merging. In an exemplary embodiment, semantic criteria are applied as follows:

Define $S_{int}=S_1 \cap S_2$, $V_{int}=V_1 \cap V_2$, $O_{int}=O_1 \cap O_2$. Define $S_{diff}=(S_1 \setminus S_2) \cup (S_2 \setminus S_1)$, $V_{diff}=(V_1 \setminus V_2) \cup (V_2 \setminus V_1)$, and $O_{diff}=(O_1 \setminus O_2) \cup (O_2 \setminus O_1)$. Define $S^*_{int}$, $V^*_{int}$, and $O^*_{int}$ to be the sets composed of the closest contextual synonyms of all the words in $S^*_{int}$, $V^*_{int}$, and $O^*_{int}$ respectively, using the contextual similarity metric from the algorithm presented in FIG. 1C.

Initially, $C_3$ contains only the intersections of $C_1$ and $C_2$, i.e. $C_3=(S_{int}, V_{int}, O_{int})$. The system grows $C_3$ by adding words from the difference sets of $C_1$ and $C_2$ only if they are among the closest contextual synonyms of the words in the intersections. Formally: $C_3=<(S_{diff} \cap S^*_{int}) \cup (S_1 \cap S_2)$, $(V_{diff} \cap V^*_{int}) \cup (V_1 \cap V_2)$, $(O_{diff} \cap O^*_{int}) \cup (O_1 \cap O_2)>$.

As compared to prior approaches, principles of the present disclosure enable (i) a generalized concept/relationship representation of text that overcomes surface level differences (which arise when different keywords are used for related concepts) without drift, (ii) a higher-level semantic network representation of related stories, and (iii) an up to 36% boost in the challenging automated story detection task.

With reference now to FIGS. 2A through 4D, in various exemplary embodiments, systems and methods for story form detection in text utilizing concept-based co-clustering may be implemented.

A key component of spreading an ideology is the utilization of cultural narratives tailored to specific target audiences. For example, extremists are known to adopt historically deeply rooted narratives from the cultural heritage of their target audience in order to gain their attention. Narratives are systems of stories that are linked by common archetypes, forms and themes. A story is defined as an actor(s) taking an action(s) that culminates in a resolution(s). The actors, actions and resolutions in these stories form the template of a strategic message regarding the current events which is used by extremists to justify their actions and policies, persuade their target audience and gain followers. Hence, identifying and countering the story forms found in these messages is an important part of counter violent extremism efforts. Accordingly, exemplary systems and methods disclosed herein present a framework to help subject matter experts rapidly analyze large collections of extremist narratives and discover their underlying story forms. These exemplary systems and methods streamline the narrative analysis by providing bi-clusters of stories and their underlying characteristic features. Another contribution of these exemplary systems and methods is improved clustering performance obtained through the utilization of concept-based features compared to previously used keyword-based features.

The recurring themes in extremist narratives can be categorized into general story forms. These story forms are characterized by archetypes and their actions. Via application of exemplary systems and methods, information about the story forms is revealed via clustering analysis. As opposed to prior approaches, generalized concepts derived from extracted overlapping subject-verb-object relationships are better suited to be used as features in clustering because they provide information regarding the underlying semantic structure of these story forms.

Exemplary methods utilize clustering in the analysis of data without prior labels or categories. Two central aspects of clustering are: (i) semantic quality of resulting clusters; and (ii) their descriptive features (i.e., clusters should be self-descriptive in order to present a meaning to the user). Prior clustering methods provide ways to group data. However, these prior methods do not automatically yield descriptive features for the groups without further processing (i.e. through a classifier). Co-clustering as disclosed herein, on the other hand, identifies both the underlying groups, out of the data, along with their characteristic features. It simultaneously clusters the rows and columns of an input matrix generating a subset of instances which exhibit high similarity across a subset of features, called bi-clusters. Since descriptions of the clusters are produced simultaneously with clustering, co-clustering presents an advantage over conventional clustering methods in connection with exemplary methods and systems.

Prior efforts in co-clustering text data relied on term-document matrices and lexical features, mainly n-grams. In various exemplary systems and methods, co-clustering of stories may be performed using two different types of features: standard uni-grams/bi-grams, and generalized concepts that rely on extracted linguistic roles. Generalized concept-based representations of extremist stories or other narratives may be utilized. In exemplary methods, the residual error of factorization with concept-based features is lower than the residual error with standard keyword-based features. Qualitative evaluations also suggest that concept-based features yield more coherent, distinctive and interesting story forms compared to those produced by utilizing standard keyword-based features.

Figure 2A:
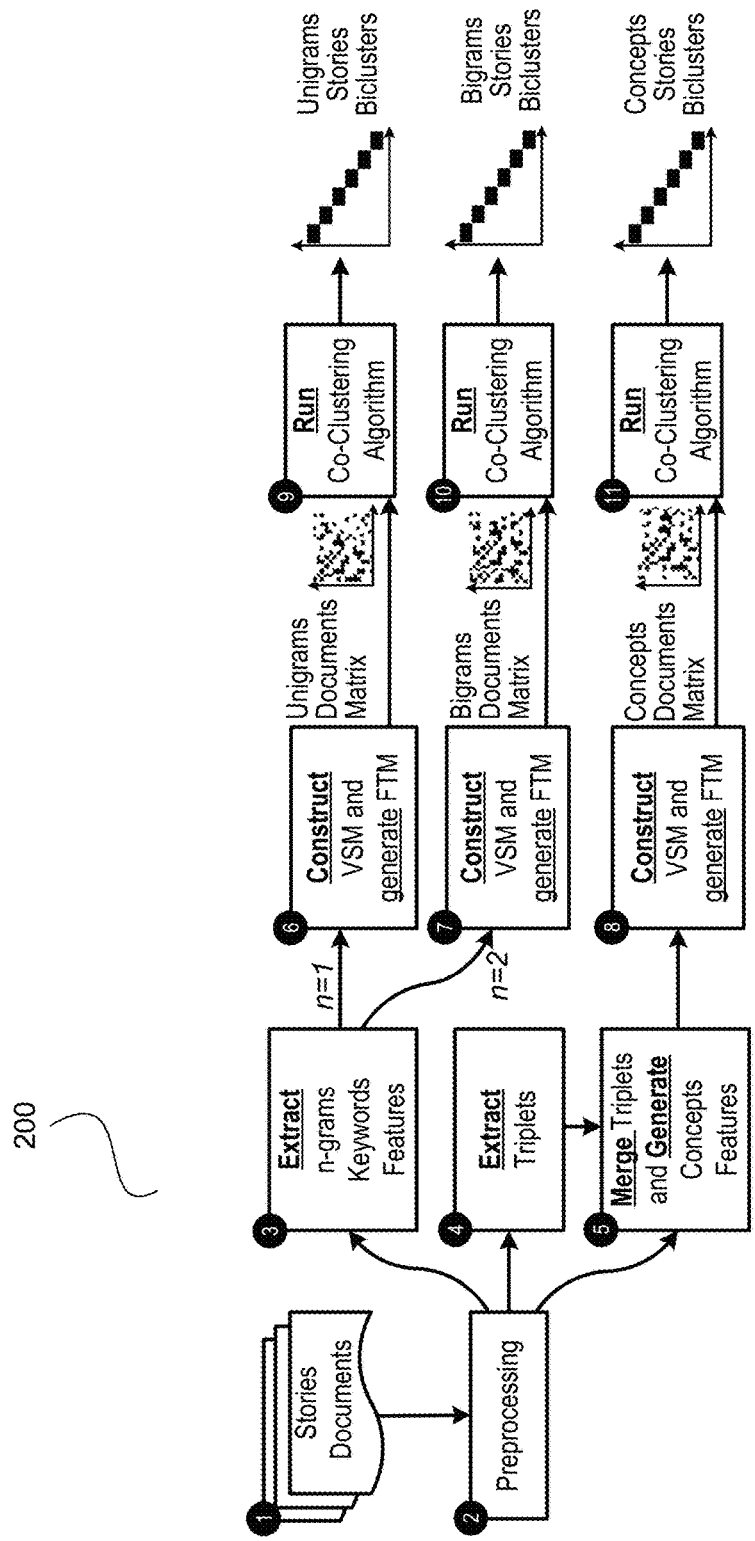
FIG. 2A illustrates an architecture for an exemplary system for story form detection in accordance with an exemplary embodiment.

The components of one exemplary system and corresponding method 200 are presented in FIG. 2A. The system utilizes an input document set consisting of stories. The data may be analyzed at the paragraph level (i.e., each document contains a single story paragraph). Other suitable assessment levels may be utilized, as appropriate. Pre-processing is applied in order to clean and prepare the paragraphs for feature extraction (FIG. 2A, steps 1 and 2). Three different feature sets (uni-grams, bi-grams and generalized concepts/relations) are generated from the story paragraphs. Concepts/relations are obtained, and triplets are generated (FIG. 2A, steps 3, 4 and 5). Uni-grams and bi-grams are ranked based on their TF-IDF values and feature matrices are produced (FIG. 2A, steps 6 and 7). A binary feature matrix is also created with concept/relational features (FIG. 2A, step 8). A co-clustering algorithm is run on uni-gram, bi-gram and concept-based feature matrices to produce bi-clusters of story forms and their associated features (FIG. 2A, steps 9, 10 and 11). Quantitative and qualitative evaluations may then be performed on the resulting bi-clusters as discussed hereinbelow.

In an exemplary embodiment, a system is configured to address a problem as defined below. For a given set of documents comprising stories {D1, . . . , DN} where N denotes the number of documents, an exemplary method generates two sets of features: n-grams features and the generalized concepts. The exemplary system serves to identify which type of features yield better bi-clustering of stories into story-forms. Quality may be evaluated, for example quantitatively by employing NMF residual error measure, or qualitatively in collaboration with a subject matter expert.

The exemplary method extracts highest ranked uni-grams and bi-grams by utilizing term frequency-inverse document frequency (TF-IDF), a simple form of cross entropy and a common technique used in informational retrieval tasks. Subject-verb-object triplet extraction is the basic building block towards generalized concepts. The story corpus is processed to resolve its co-references using a suitable co-reference resolver or resolvers. Prior approaches utilized ClearNLP to extract triplets. However, using this triplet extractor alone resulted in poor recall. Other prior approaches used an enhanced approach that utilized additional triplet extractors (Alche-myAPI, Everest, or Reverb) and implemented a Cartesian product of the atomized phrases in all argument positions to double the production of extracted triplets. However, various exemplary embodiments utilize a generalized triplet representation by suitably "merging triplets" into generalized concepts without a drift.

An exemplary method uses both syntactic and semantic corpus-based merging criteria to generalize triplets into concepts. A pair of (subject)-(verbs)-(objects) triplets is merged further only if (i) they share a common context among their corresponding terms (i.e. syntactic criteria) and (ii) they satisfy corpus-based support and similarity measure of "contextual synonymy" (i.e. semantic criteria) between their newly added terms and existing terms. Next, a hierarchical bottom-up merging algorithm allows information to propagate between clusters of related subjects, verbs and objects leading to a set of generalized concepts.

Figure 2B:
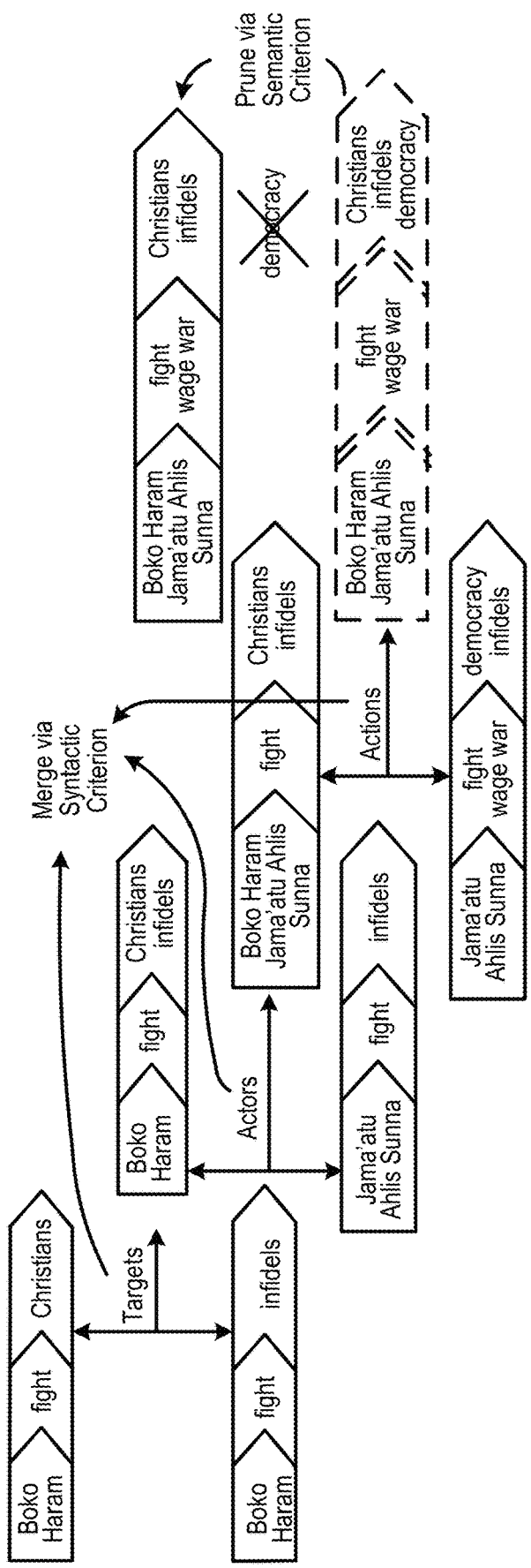
FIG. 2B illustrates generation of concepts/relations triplets (subject, verbs, objects) in accordance with an exemplary embodiment.

FIG. 2B illustrates an instance of how syntactic and semantic criteria are applied on a sample set of triplets extracted from a story corpus. Initially, syntactic criterion is satisfied between the pair of triplets: (Boko Haram, fight, Christians) and (Boko Haram, fight, infidels) since they share a common (subject, verb) context (Boko Haram, fight). Hence, this pair becomes a candidate for merging if a "contextual synonymy" relationship exists between their newly added and existing terms (i.e. Christians and infidels). Contextual synonyms are not synonyms in the traditional dictionary sense, but they are phrases that may occur in similar semantic roles and associated with similar contexts.

In the next step the resulting generalized concept (Boko Haram, fight, {Christians, infidels}) can be merged with (Jama'atu Ahlis Sunna, fight, infidels) due to their shared (verb, object) context: (fight, infidels) meeting the syntactic criteria, and due to the existence of contextual synonymy relationship between Boko Haram and Jama'atu Ahlis Sunna. Syntactic criterion is applied iteratively to identify candidate concepts for merging in combination with the application of semantic criterion to screen for the introduction of new topics that could cause a generalized concept to drift from it's original meaning.

FIG. 2B also illustrates potential additional candidates for merging based on syntactic criteria: ({Boko Haram, Jama'atu Ahlis Sunna}, fight, {Christians, infidels}) and (Jama'atu Ahlis Sunna, {fight, wage war}, {infidels, democracy}). First, a core component is created using only the intersections of the subject, verb, object sets of these two concepts: (Jama'atu Ahlis Sunna, fight, infidels). The remaining words from the two candidates are added to the core concept only if they are among the closest contextual synonyms of at least one of the already existing members in the core item. For example, the exemplary algorithm would permit the addition of Boko Haram, wage war and Christians to the resulting set since the newly added terms are among the closest contextual synonyms of Jama'atu Ahlis Sunna, fight and infidels in their respective argument positions. However, democracy would be left out of the object argument position in the resulting generalized concept since it is not among the contextual synonyms of neither infidels nor the Christians according to the corpus-based definition of "contextual synonymy" (i.e. semantic criteria).

Clustering is an unsupervised learning technique that tries to draw inferences from given data where data labels (i.e. classes) are concealed or unknown, as in the datasets wherein exemplary methods are utilized. This approach is adopted to assist in benchmarking uni-grams, bi-grams and the generalized concepts as features when used for story forms detection in a story corpus. Principles of the present disclosure allow determination of which feature set provides the highest quality bi-clustering results. Comparing different feature sets while applying co-clustering not only allows determination of which feature set can quantitatively perform better but also, it offers insights about which feature set could provide more coherent, distinctive and interesting story forms as clusters.

To formalize a co-clustering problem solved by exemplary systems and methods, an exemplary story corpus contains M documents and N features provided as the matrix $A=(a_{ij})M \times N$ such that $a_{ij}$ represents the entry value of i-th story document and j-th feature. The A feature-term-matrix can be also written as $A=(R, C) \in R^{M \times N}$ where $R=\{1, 2, \ldots, M\}$ denotes row indices, and $C=\{1, 2, \ldots, N\}$ denotes column indices.

Here, the exemplary method objective is to find a set or sets of sub-matrices or bi-clusters, say $B_k (X_k, Y_k)$, such that $X=M_1, \ldots, M_a \subseteq R$ and $Y=N_1, \ldots, N_b \subseteq C$ as separate subsets of R and C. This task is an NP-hard problem, but an exemplary method can utilize an optimization approach with a greedy iterative search utilizing Non-negative Matrix Factorization (NMF) to produce effective results.

Co-clustering is an NP-hard problem, yet many different optimization based approximation algorithms have previously been developed. One of those is the Non-Negative Matrix Factorization or decomposition based method which factorizes a given matrix into multiple matrices revealing substructure patterns within the matrix. This method has been widely used in many applications such as bioinformatics, image processing, and text mining. NMF can be used to factorize our $A \in R^{M \times N}$ feature-term-matrix into a pair of matrices $U \in R^{M \times K}$ and $V \in R^{K \times N}$ having non-negative elements, such that $A \cong UV$ constructing an approximation where U represents the basis vectors (or factors), and V represents the coefficients on the linear combination of the factors that allows construction of the original A feature-document-matrix. K variable can be used as the number of clusters and it has to satisfy $K<\min\{M, N\}$. The mathematical formulation of the optimization problem is written as follows:

$$\underset{U,V}{\text{minimize}} \frac{1}{2}\|X - UV\|_F^2 + \frac{1}{2}\|U\|_F^2 + \frac{\lambda}{2}\sum_{i=1}^{n} \|v_i\|_1 \quad \text{(Equation 1)}$$

subject to $U, V \geq 0$.

The above optimization problem is a modified version of NMF since the standard form of NMF has shortcomings of non-unique and scale-variance outputs. Prior approaches enhanced sparseness degree of basis vectors by introducing regularizations as well as alternating negative constraints update technique based on the multiplicative update. The multiplicative update, in the standard NMF, does not necessarily yield sparse basis vectors. The sparse optimization problem can be solved using non-negative quadratic programming (NNQP). The modified NMF compares different feature sets by looking into the residual error E after factorization, where E is the error term after decomposing A matrix into U and V. Lower E values indicate better underlying structure detection in A. A suitable software package may be utilized for the implementation of the Sparse NMF: A=UV+E (Equation 1).

Exemplary Results. An exemplary system and method was applied to a story corpus consisting of 6,856 paragraphs which are pulled from a database of Islamist extremist texts. Texts are collected from online sources such as websites, blogs and other news sources that are known to be outlets of extremist groups such as Al-Qaeda, ISIS or their followers who sympathize with their cause and methods. Extremists' texts are not entirely composed of stories. After the crawling process, subject matter experts annotated the paragraphs based on a coding system, consisting of eight mutually-exclusive categories: story, exposition, imperative, question, supplication, verse, annotation, and other. A paragraph is labeled as a story if it tells a sequence of related events, leading to a resolution or projected resolution. The exemplary system and method was applied to the paragraphs which are coded as stories.

Figure 3A:
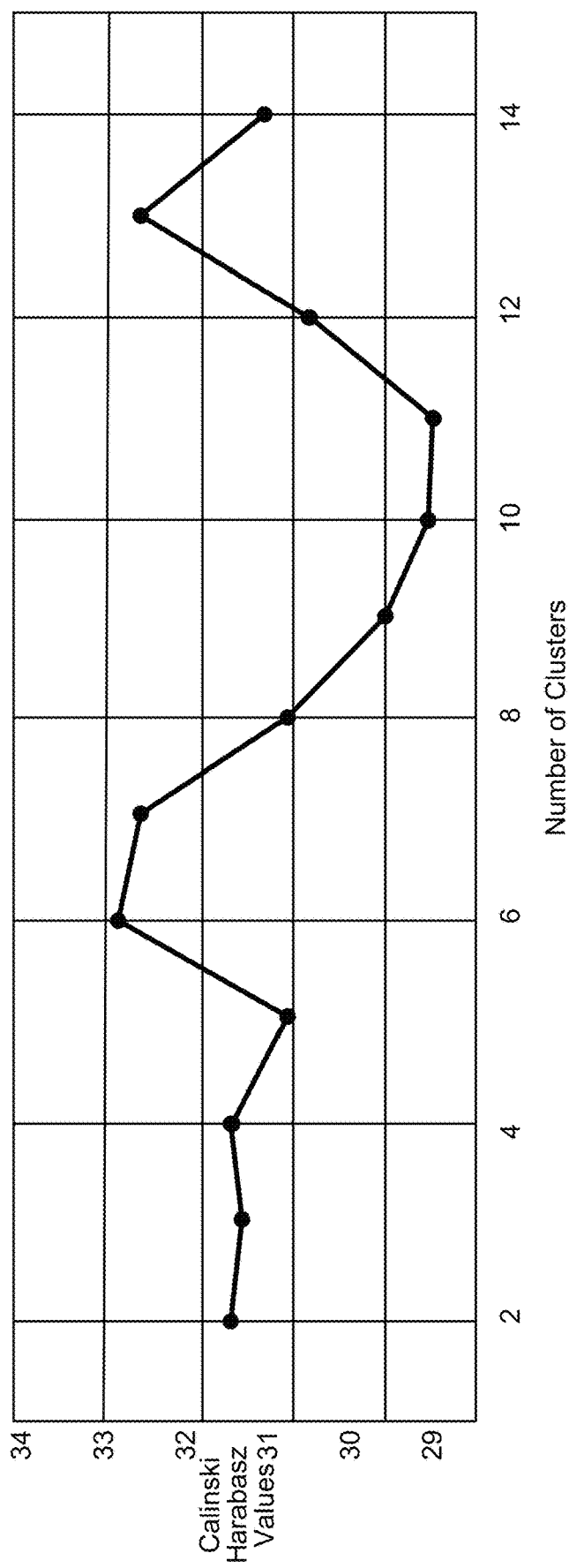
FIGS. 3A and 3B illustrate analysis to determine an optimal number of clusters in accordance with an exemplary embodiment.
Figure 3B:
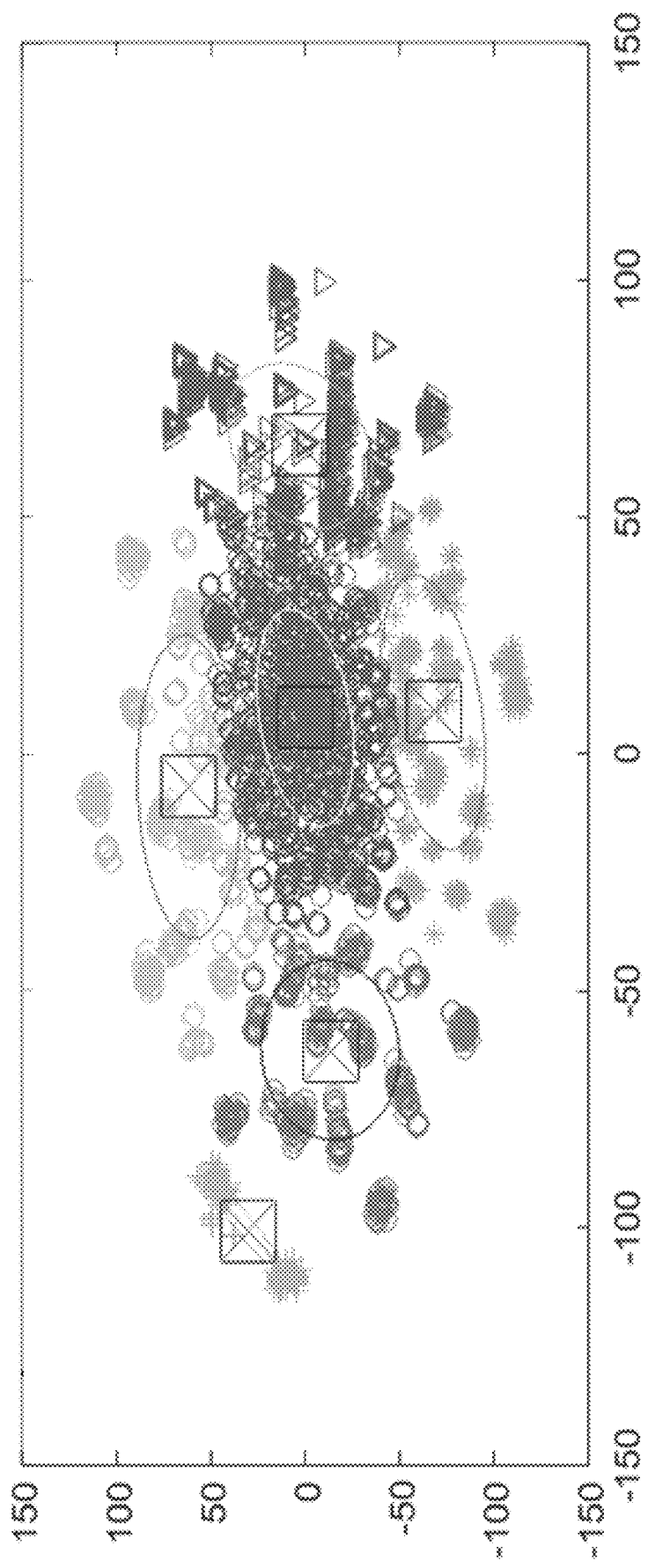

There was no ground truth of story forms available for the example story corpus, therefore, the system conducted additional analysis to determine the number of clusters before the results were presented to subject matter experts for qualitative evaluation. Determining the right number of clusters has been a challenging problem in clustering and various techniques have been suggested in the literature to solve this problem. In an exemplary embodiment and method, the system obtains an embedding of stories×concepts feature matrix into 2-D. A t-Distributed Stochastic Neighbor Embedding (t-SNE) technique may be utilized to reduce the data dimension and visualize the block diagonal sub-structures. Next, the system utilizes an external measure from literature, the Calinski-Harabasz index, to measure the quality of a clustering across different numbers of clusters. The Calinski-Harabasz index or variance ratio criterion (VRC) is proportional to the ratio of the overall between-cluster variance and the overall within-cluster variance. In this scheme, the higher corresponding VRC value, the better the clustering performance. FIG. 3A shows a plot of VRC values across a number of clusters ranging from 2 to 14. A value which causes a sharp spike in the VRC plots is often a suitable choice. In FIG. 3A, we can see that there is a sharp spike at 6 clusters. This indicates that setting the number of clusters to 6 is a plausible choice in order to obtain a good clustering scheme. FIG. 3B shows a scatter plot of 6 clusters obtained by the system using K-means after 2D embedding. The cluster centroids are also marked alongside their error ellipses representing their covariance matrices.

Quantitative Evaluation

Figure 4A:
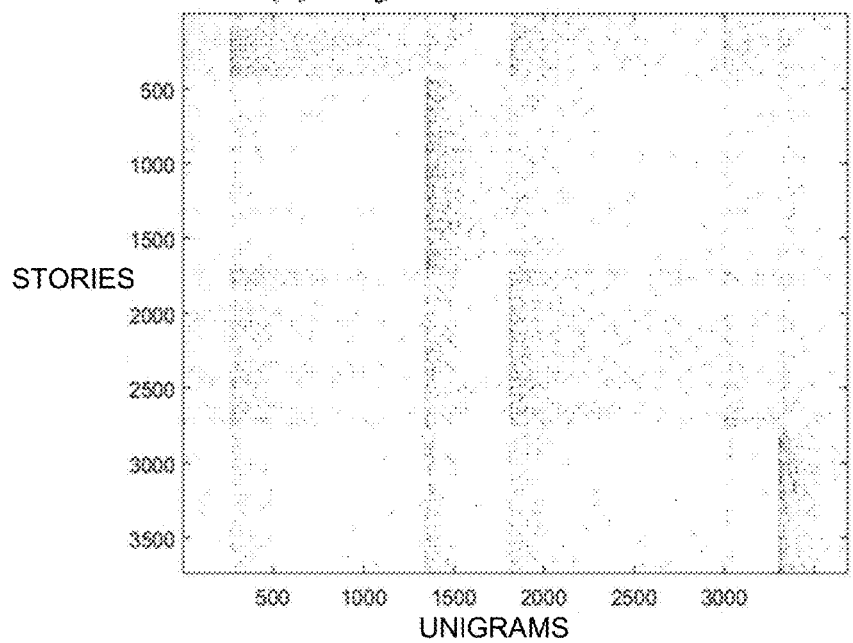
FIG. 4A illustrates a block diagonal sparsity structure of a feature matrix after clustering, where the bi-clusters (unigrams v. stories) are represented along the diagonal blocks in accordance with an exemplary embodiment.
Figure 4B:
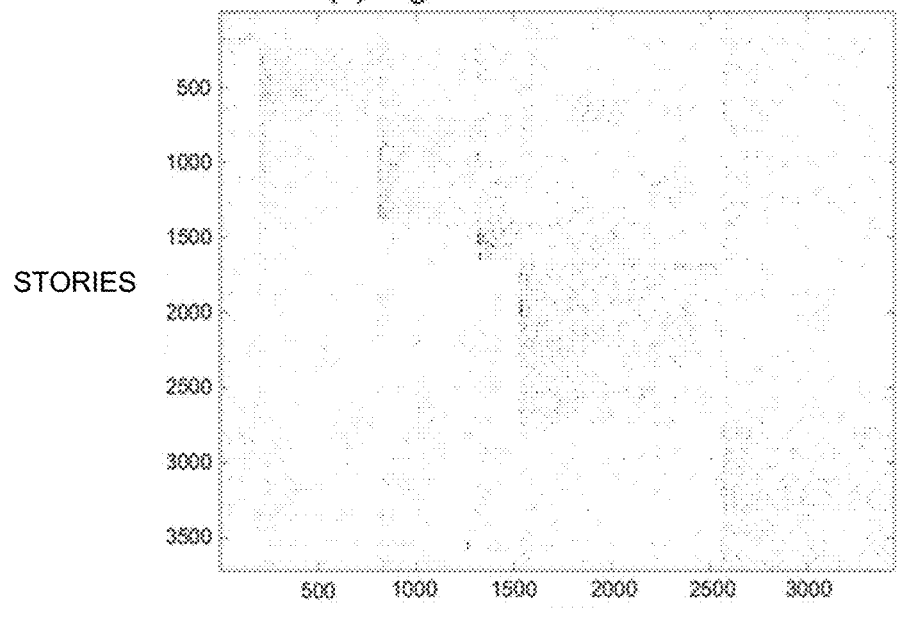
FIG. 4B illustrates a block diagonal sparsity structure of a feature matrix after clustering, where the bi-clusters (bigrams v. stories) are represented along the diagonal blocks in accordance with an exemplary embodiment.
Figure 4C:
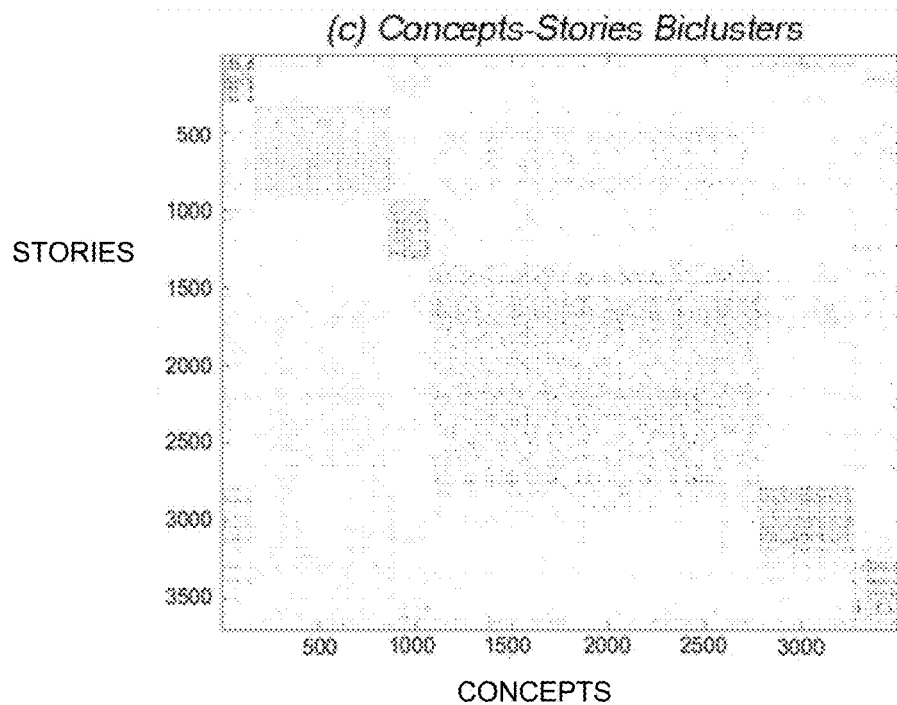
FIG. 4C illustrates a block diagonal sparsity structure of a feature matrix after clustering, where the bi-clusters (concepts v. stories) are represented along the diagonal blocks in accordance with an exemplary embodiment.

Block Diagonal Sub-Structure. FIGS. 4A-4C illustrate the block diagonal sparsity structures of the feature matrices after clustering, in which, the bi-clusters (uni-grams vs. stories bi-clusters in FIG. 4A, bi-grams vs. stories bi-clusters in FIG. 4B, concepts vs. stories bi-clusters in FIG. 4C) are represented along the diagonal blocks. Block diagonal plots are obtained by reordering the indices of stories and their characteristic features in each row and column for each cluster to show their groupings.

Figure 4D:
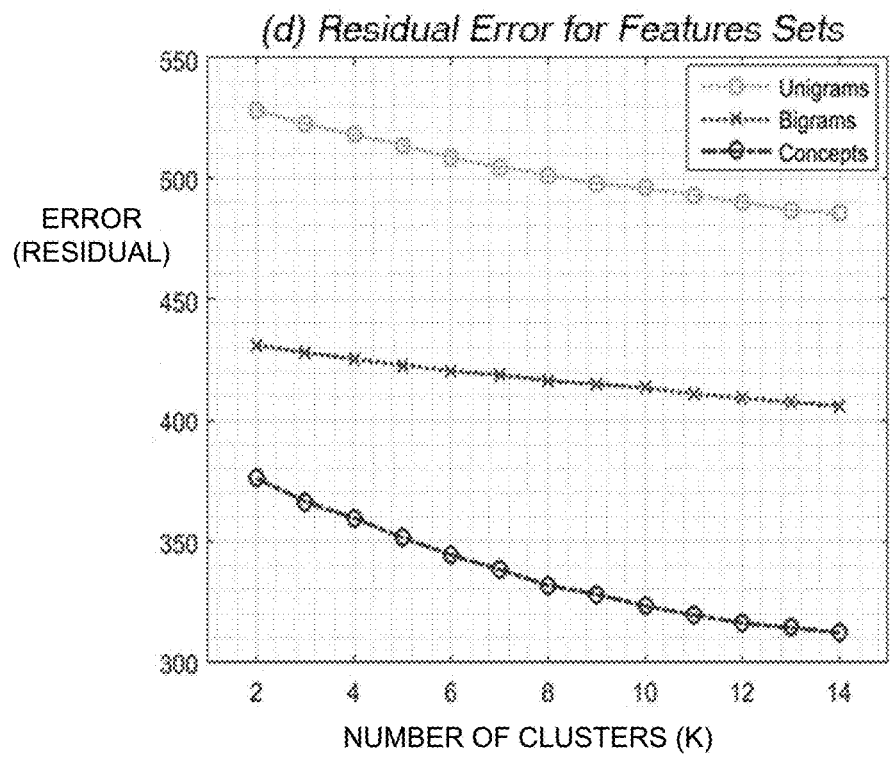
FIG. 4D illustrates the residual error of non-negative matrix factorization of the feature matrices of FIGS. 4A, 4B, and 4C for different numbers of clusters in accordance with an exemplary embodiment.

FIG. 4D illustrates the residual error of non-negative matrix factorization of three feature matrices for different numbers of clusters. Residual error is computed by using the formula shown in Equation 1. The error decreases as the number of clusters increase, since the number of clusters also represents the dimensionality of the resulting approximation matrices. In residual error plots, it can be observed that the concept-based features consistently yield lower residual errors compared to both the uni-gram and the bi-gram based features.

Qualitative Evaluation

To determine if the clusters generated by the exemplary systems and methods disclosed herein yielded a valuable analytic tool and an improvement over other clustering methods for an anticipated use case (rapidly analyzing large amounts of story text to determine themes and overarching narratives to benefit strategic communication and counter-messaging activities), a subject matter expert (SME) conducted a qualitative evaluation.

Six clusters were generated using the concept-relations technique discussed here and six clusters were created using bi-gram co-clustering techniques. The concept-based clusters are shown in Table 1, and the bi-gram-based clusters are shown in Table 2. The SME read the stories drawn from each of the twelve clusters without cluster identification noting narratively significant features such as the protagonists and antagonists, types of actions taken, and evident and implied resolutions. Subsequently, the SME also conducted an evaluation of the feature sets of each clustering method, looking for patterns and indicators of meaning useful to a communication analyst. These efforts were synthesized to draw conclusions about the clusters.

TABLE 1

CONCEPT-BASED CLUSTERS

| Cluster | Key narrative features | Notes and significance |
|---|---|---|
| 1 | Protagonists either unspecified or "Lions of Islam"; frequent construction of attack-result; antagonists always labeled with epithets (apostates, pagans, safavids, crusaders) | Function: justify the threat to Muslims by 'others' who are not to be respected |
| 2 | Protagonists: Lions or mujahidin: actions attack, carried out: news format | Function: legitimize the insurgent/extremist actions by formatting in a news report format; convey the extremists are winning the war and are champions of Islam |
| 3 | Protagonists: mujahidin: Shabaab. Lions; Antagonists: US forces, apostates, Federal Police: Action: detonation of IEDs, car bombs, landmines and other explosives; settings: Afghanistan, Iraq, Somalia | Similar to cluster 5, but with much more variation: Highlights the vulnerability of adversay forces and highlights effectiveness across Muslim regions |
| 4 | Significant variation in protagonists, antagonists, settings and actions: Minor emphasis on the killing of women and children (by US/allies) | Very loose cluster with no discernable patterns |
| 5 | Protagonist: mujahidin; antagonists; US and puppets; action: bomb blast, detonation | VERY tight cluster of stories of IED attacks against US and Afghan forces (puppets) set primarily in Afghanistan |
| 6 | Protagonists: Lions of Ansar Islam; actions: plant or detonate bomb: antagonists: US, apostates, crusaders | Another very tight cluster, analogous to Cluster 5 but set in Iraq: illustrates geographically specific epithet |

TABLE 2

BIGRAMS-BASED CLUSTERS

| Cluster | Key narrative features | Notes and significance |
|---|---|---|
| 1 | Protagonists: often unspecified, mujahidin; Actions: attacking with emphasis on bombs and vehicles, Note: name of Taliban spokesman frequent: emphasis is Afghanistan: | Protagonists and antagonists are not consistent; stories contain repeated phrases: mention of spokesman name a distinguishing feature |
| 2 | Protagonists: lions of ansar; Antagonists: inconsistent names, locations action: wide range, with most frequent being detonation destroying vehicles, with praise and gratitude to God. Emphasis on date | No significant difference in action between cluster 1 and 2 and 3 |

TABLE 2-continued

BIGRAMS-BASED CLUSTERS

| Cluster | Key narrative features | Notes and significance |
|---|---|---|
| 3 | Actors: security detachment (presumed subject/attacker) Action: emphasis of attack/result, detonation, and killing result; strong emphasis on date | Only difference between cluster 2 and cluster 3 is frequent actor "security detachment" |
| 4 | Action: attacks in Afghanistan; against Actors: US, NATO. invaders and puppets, vehicle/military base | Wide variety of actions within general category of "attack": clear focus of Afghanistan: |
| 5 | Actors; Shield of Islam Brigades, mujahidin, AQIM; Iraqi National Guard, Mahdi army, and police Action: detonate explosive | Similar to clusters 1-3, but with greater emphasis of claims of attacks, potentially indicating purpose/intent of story |
| 6 | Actors: US, ISIS, GOD, Bin Laden, Shabaab, mujahidin, messenger: Frequent invocations of god, god's grace and praise: action: frequent construction 'carried out' operation | No consistency to the locations or actors in this cluster: variety points of view (POV) |

Concept Clusters Vs. Bi-Gram Clusters. In general, both clustering methods produced some distinct clusters that make sense under qualitative evaluation. Notably, the dataset is dominated by stories with an overall structure described by previous analysis as a "victorious battle story". In this story form, a protagonist (member of some extremist group) takes some form of military action killing or injuring antagonists (US forces or police). The prevalence of this basic story form within the dataset complicates identifying robustly distinct clusters in terms of narrative significance. This is because the characteristics that distinguish groups of stories tend to be the terms used for protagonists and antagonists and the settings, whereas the general meaning (successful attack by insurgent forces) remains relatively constant.

However, despite that limitation, the exemplary concept clustering method produced meaningful clusters with notable distinctions and with useful implications for communication analysis. The bi-gram cluster method produced clusters with less distinctiveness and significance in terms of overall meaning. For example, bi-gram clusters 2 and 3 are nearly impossible to distinguish, involving similar stories, nearly identical actions, and having a wide range of protagonists and antagonists. In the set of concept clusters, clusters 1, 2, 5 and 6 were the most distinctive clusters, especially 5 and 6. The stories in cluster 5 are very similar: mujahidin in Afghanistan attack US and Afghan forces with improvised explosives. The stories consistently refer to the Afghan forces as "puppets".

Notable Clusters. While the variations across the dataset are subtle (as noted above), the exemplary concept clustering method does usefully identify some meaningful clusters. Concept cluster 2, for example, contains stories with a particular subject-verb construction as this example illustrates: "Another martyr operation was carried out by Mujahid Abdul Wali, who carried out the attacks on military bases of puppet Afghan soldiers that were still in the same district with the first martyr operations." This construction contributes to a semi-objective news-narrative, belying the propagandistic content. This format contributes to the positioning of the mujahidin as champions of Islam defending the ummah, and also conveys that they are winning the war.

Concept cluster 1 exhibits another very consistent formulation that contributes to strategic communication goals. Stories in this cluster are dominated by the verb construction of attack-result in which the stories describe an attack and include the results such as the example: "At 1145 [0845 GMT] on 5 August, one of our combat groups detonated a guided explosive device against a patrol belonging to the Crusader occupation forces on Kirkuk-Al-Riyad Road in western Kirkuk. The explosion resulted in destroying a specialized vehicle and killing or wounding all those on board. Praise be to God, the Lord of all creation." Like concept cluster 2's dispassionate, news-style reporting of operations, this cluster's emphasis on the successful results of the attacks conveys the meaning that the insurgents are a strong force, a strong champion and are winning the conflict. Importantly, this meaning is contained in the semantic combination of attack and result, but these words are often separated by dependent clauses or in completely separate sentences. It will be appreciated that while this association is detected via application of certain principles of the present disclosure, this association of attack and result would not be detected and clustered by prior bi-gram clustering techniques.

Concept cluster 1 has an additional significant feature: the antagonists are almost exclusively referred to by derogatory epithets ("apostates", "pagan army", "safavids", "Crusaders"). This rhetorical technique dehumanizes these groups and assigns unsavory and immoral characteristics to them, thereby emphasizing the threat to the ummah by their very existence. Violence by the community's champion is therefore justified against these groups that threaten the community. Identifying the rhetorical techniques is the first step to defusing their inflammatory and radicalizing power, and thus a technique that can distill these constructions from a body of text data is valuable.

Narratives are systems of stories that construct meaning. That meaning is constructed in part by the patterns of relationships created by the actors and actions that make up the constituent stories. In order to analyze the narratives circulating within a discursive environment, the ability to distill stories from a larger corpus of information, and then cluster those stories into meaningful groups of story forms is necessary. In this process, a clustering method that accounts for patterns of relationships of actors and actions is desirable. Concept-based co-clustering methods and systems as disclosed herein, with attention to subjects and objects (actors) and verbs (actions), provide a robust framework that meets this strategic communication analysis goal.

Frame Detection and Categorization Based on Generalized Concepts

In addition to the foregoing systems and methods, principles of the present disclosure contemplate use of systems and methods for detecting and evaluating frames in text. With reference now to FIGS. 5A through 5F, an exemplary system and method 500 for detecting and evaluating frames in text may be utilized to evaluate a corpus of material. Various exemplary embodiments disclosed herein discuss evaluation of a corpus of material directed to the concept of climate change; however, any topic or concept may suitably be analyzed via application of principles of the present disclosure.

Climate change has provoked heated debates on the global political and media arenas. Media framing offers an "interpretative package" for average citizens on how to make sense of climate change and its consequences to their livelihoods, how to deal with its negative impacts, and which mitigation or adaptation policies to support. News frames encourage salient interpretation of debated issues through the usage of rhetorical devices (e.g. words, repetitive phrases, and metaphors). Increasingly, governments and international communities are concerned about the security implications of climate change as empirical research has documented that climate change is linked to increased risk of violent conflict. For example, in May 2015, U.S. President Barack Obama suggested that extreme weather is a threat to national security and elevates the risk of global instability and conflict. Some popular press adopted a security threat frame to gain public attention. Therefore, systematic detection of news frames related to climate change offers better understanding of stakeholders and their competing perspectives.

Politicians have used framing on hotly debated issues to shift public opinion, gain support and pursue their agenda. A frame is the bundling of a component of oratory to urge certain perceptions and to dishearten others. Framing is accomplished when a choice of words, expressions, subjects and other logical gadgets support one understanding of an arrangement of realities, and debilitate other interpretations. An exemplary framed issue is climate change. The internet created a public space for politicians and stakeholders to frame climate change and related issues to push for their agenda. Online tools such as the blogsphere, microblogging and social media streams have increased the availability of data on climate change related debate and made it feasible for researchers to analyze them.

Framing assessments typically utilize a qualitative analysis of a number of texts by subject matter experts to identify and code a set of frames. This is a time consuming process that does not scale well. In order to address the scalability problem, via application of principles of the present disclosure, machine learning techniques can be utilized to detect and classify frames. An exemplary system for automatic detection of frames in sentences may be applied to process a climate change related corpus, and map them to one of four expert identified frame categories: solution, problem threat, cause, and motivation. It will be appreciated that this task can be described as a multi-level multi-class classification problem where we first classify each sentence as Frame or Non-Frame. Then, the Frame sentences are further mapped into one of four predefined frame categories. In particular, if a sentence is (subject,verb,object) patterned then using generalized concepts and relations as features, as contemplated by the methods disclosed herein, produced significant results compared to classical textual features (e.g. uni-grams and bi-grams) while detecting and categorizing Frame/Non-Frame sentences. In an exemplary method utilizing unsupervised learning, k-means were utilized, and the results aligned with development of the four frame categories above. In another exemplary method utilizing supervised learning, SVM, Random Forests, and sparse logistic regression classifiers may be utilized (sparse logistic regression is preferred as the best performing classifier for these tasks).

Figure 5A:
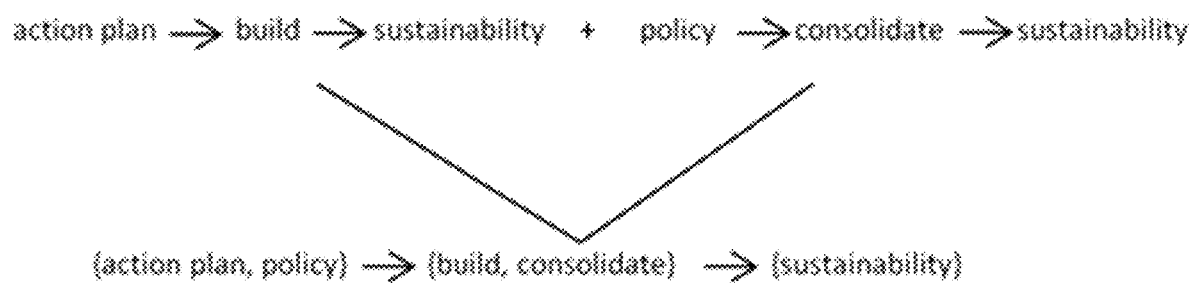
FIG. 5A illustrates merging two related concepts in accordance with an exemplary embodiment.

The exemplary generalized concepts approach extracts high-level information from text as relationships and concepts forming a semantic network. It first uses shallow semantic parser to generate POS tags to obtain semantic triplets (subject,verb,object) from text. Next, it utilizes a bottom-up agglomerative clustering approach to merge and generalize those triplets into concepts. In NLP, shallow parsing is the task of extracting the subjects, predicates or verb phrases, and objects. FIG. 5A shows how two related triplets could be merged into a higher level generalized concept. In this figure, two extracted triplets: (action plan→build→sustainability) and (policy→consolidate→sustainability) are merged to form a high level generalized concept and relationship as: ({action plan, policy}→{build, consolidate}→{sustainability}) by discovering contextual synonyms such as {action plan, policy} and {build, consolidate}. Here the definition of contextual synonyms is not based on the one in the traditional dictionary. Rather, they correspond to phrases that may occur in similar semantic roles and associated with similar contexts. In FIG. 5A the two triplets share the same object {sustainability} and semantically similar verbs; hence, we can merge their subjects {action plan,policy} as contextual synonyms.

Mainstream media serve as the main arena where international governments, social and political actors, scientists, social movement organizations interact and make competing claims about climate change issues. Communication surrounding climate change can inhibit or support science and policy interactions, propagate consensus or disagreements, and ultimately facilitate social change, depending on how messages about climate change have been framed.

Media representation of climate change plays a vital role in shaping ongoing policy discourse, public perception and attitudes. Prominent political actors frame climate risk for their own purposes, and align frames with their interests and perspectives through the media feedback processes of representing climate change risk. Studies have shown that the lay people learn about climate change mainly through consuming mainstream media news. Consequently, news media framing can catalyze public engagement and help trigger collective concern of climate change. Put differently, media framing is a powerful tool to highlight different aspects of the policy options, and promote specific interpretations or evaluations that influence decision making.

Existing typologies of climate change framing, focusing on dichotomous categories, are limited by their inability to link framing processes with movement interaction. In contrast, exemplary systems and methods may be utilized in order to understand how the media reflect different organizations interests in addressing climate change as a social problem, via supplementing the social movement to focus on resource mobilization to frame processes of collective action problems. To do that, the exemplary systems and methods herein present a nuanced typology for studying climate change framing and its adequacy for supporting a social movement that would be necessary to overcome the collective action problem. The exemplary approach provides a holistic map to evaluate how climate change media framing can enable appropriate social and policy actions that ultimately can mitigate risks of social unrest. In one exemplary application, the system and method were applied to examine framing of climate change in media and social media texts collected from the Niger Basin region over seven months from August 2014 to February 2015, using a novel coding technique to assess diagnostic, prognostic, and motivational framing as the keys to effective social movements.

Prior approaches have examined twitter streams on extracted frames and pointed out a strong tie between frames collected from news with the public opinions expressed in tweeter feeds. Other prior approaches went further to distill agenda from news and link them to action. In prior approaches, content analysis of frames in news is performed either by (1) manual frame coding, that is done by trained coders, which is costly as well as not scalable, or by (2) frame identification by using machine learning techniques that overcome human limitations by automatically detecting frames after training a classifier. Principles of the present disclosure utilize more advanced generalized concepts as features to detect and categorize frames. Exemplary systems and methods may be applied to sentence level classification and clustering, compared to prior approaches being limited to paragraph level assessment. Also, our task is a multi-level multi-class learning task where we first examine if a sentence contains a frame, and then we identify which one of four frame categories it belongs to. Moreover, exemplary systems utilize triple-extraction techniques where we can extract more features and incorporate a larger percentage of sentences into the learning model (i.e. 80% of sentences compared to 40% in prior approaches).

Figure 5B:
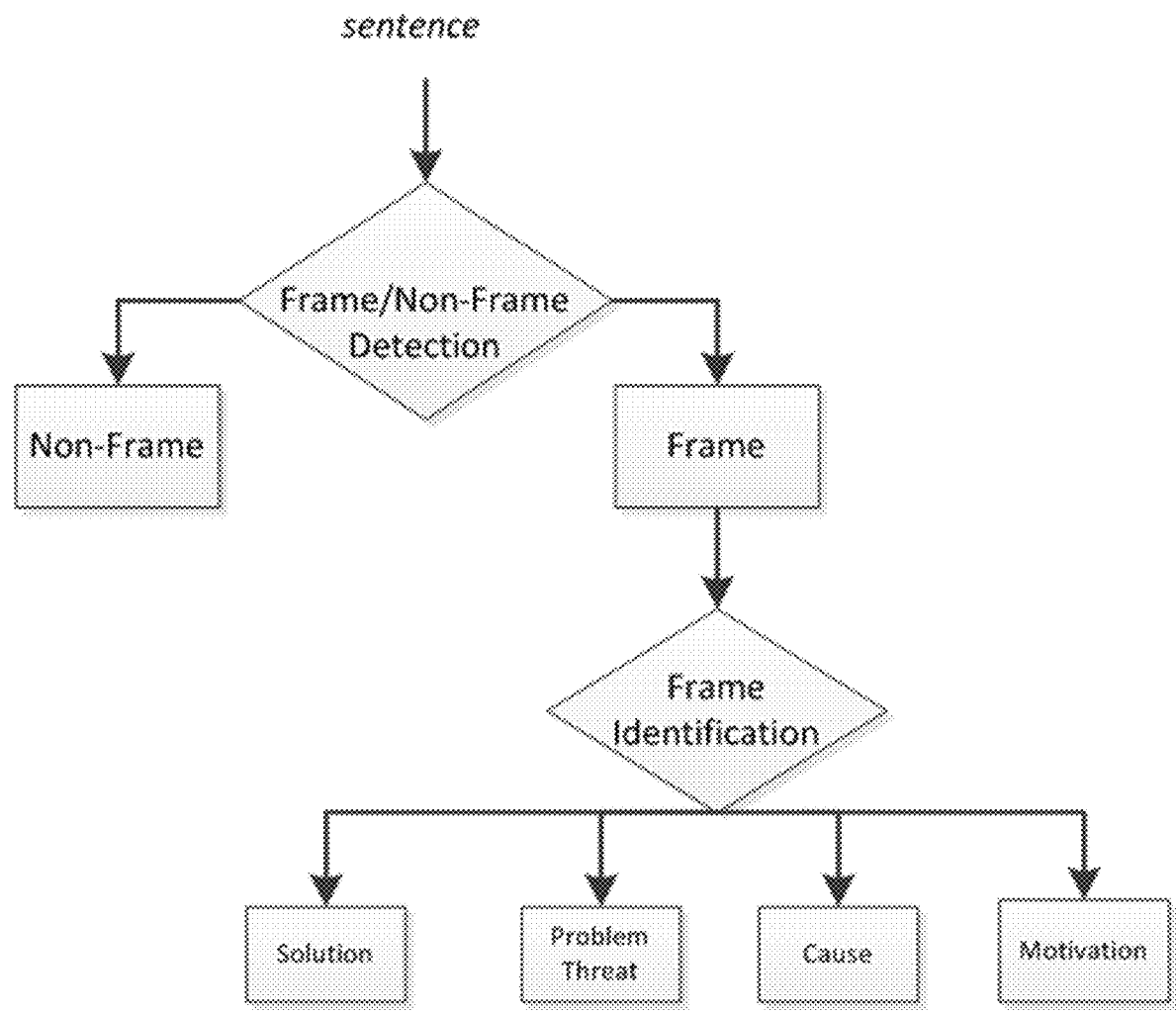
FIG. 5B illustrates multi-level, multi-class classification in accordance with an exemplary embodiment.

Given a set of documents {D1, . . . , DM} where each document contains one or more paragraphs. First, the exemplary method splits documents into sentences {S1, . . . , SN}. Next, using sentences as data points, the system resolves whether a sentence Si contains a frame or not. And, if the sentence contains a frame, then the system identifies its category, as one of: {Solution, Problem Threat, Cause, Motivation}. FIG. 5B shows an exemplary multi-level multi-class problem for a given sentence.

Figure 5C:
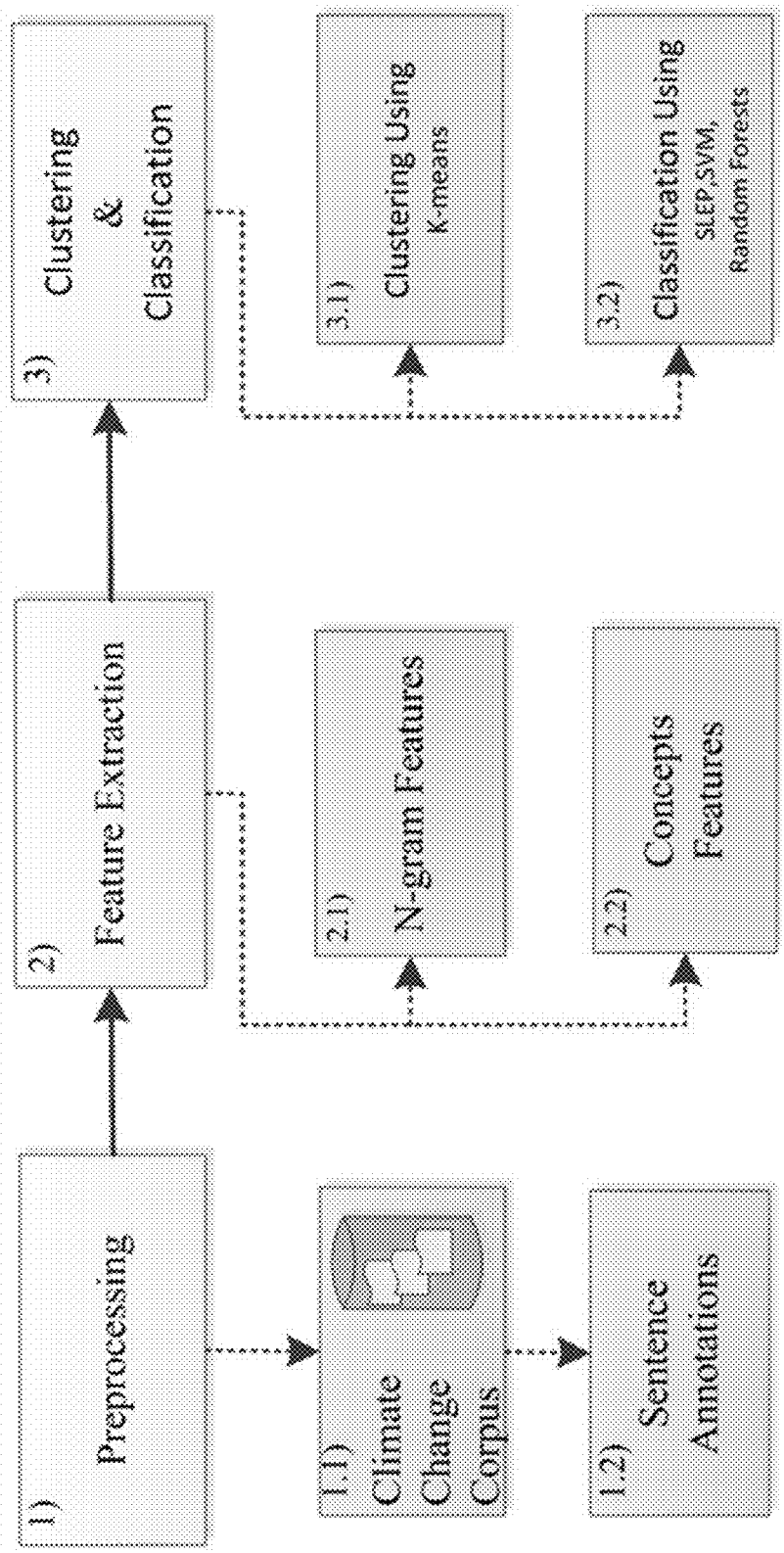
FIG. 5C illustrates an architecture for an exemplary system for communications framing in accordance with an exemplary embodiment.

The exemplary input to the exemplary system consists of documents collected from nearly 100 RSS feeds that are related to climate change in the Niger Delta region. The system performs sentence splitting of documents, identification of key frames and their categories by the coders, feature extraction (uni-grams, bi-grams, and generalized concepts), identification of discriminative features, and utilizes a predictive model to detect and identify the frame categories for sentences containing frame references. FIG. 5C illustrates components of an exemplary system and method for framing.

Climate Change Corpus. An exemplary climate change corpus is comprised of nearly 45,054 sentences extracted from news and social media websites, and are related to climate change topics in the Niger Basin region over a seven-month period from August 2014 to February 2015. There are 16,050 sentences coded as Frame sentences and 29,004 as Non-Frame sentences by domain experts. Frame sentences are further categorized into one of four categories: Solution, Problem Threat, Cause, and Motivation.

Development of Four-Class Typology of Media Framing. Existing typologies of climate change framing, focusing on dichotomous categories, are limited by their inability to link framing processes with movement interaction. However, in order to understand how the media reflect different organizations interests in addressing climate change as a social problem, it is desirable to supplement the social movement focus on resource mobilization to framing processes of collective action problems. To do that, the exemplary systems and methods herein present a nuanced typology for studying climate change framing and its adequacy for supporting a social movement that would be necessary to overcome the collective action problem. The typology provides a holistic map to evaluate how climate change media framing can enable appropriate social and policy actions that ultimately can mitigate risks of social unrest. The exemplary framework may be applied to various documents and materials, for example to examine framing of climate change in media and social media texts collected from the Niger Basin region, using a novel coding technique to assess diagnostic, prognostic, and motivational framing as keys to effective social movements.

Media Framing, Collective Action, and Social Movements. In the field of social movement studies, framing has primarily been used to discuss challenges of strategy formation and implementation activists face. Social movement scholars define framing as a process aimed at aligning movement meanings with the ideological perspectives of relevant audiences, including the general public, the media and policy makers in order to produce action in support of ideological goals. Understanding climate change as a collective action problem makes a social movement approach to framing relevant, as framing plays a central role in the need to mobilize resources, recognize and respond to opportunities and threats, and exercise pressure and influence by means of communication. This approach moves the study of framing beyond the limits of previous research with its focus on dichotomies, and highlights instead the potential impact of overarching framing strategies. As a complex social issue requiring engagement with multiple stakeholders and audiences (e.g. international organizations, local government, NGOs, scientists, and general public), climate change in developing countries, such as West Africa, provides fertile ground on which to explore the effectiveness of framing in propelling social movements in response to collective action problems.

The first type of frame, diagnostic framing, seeks to remedy or alter some problematic situation or issue by identifying the source of causality, blame, and/or culpable agents. The second type, prognostic framing, attempts to provide a solution or plan of attack for the identified problem. While the first two functions seek to create a consensus in the audience, the third, motivational framing, is a call to action. Motivational framing attempts to engage the audience in ameliorative collective action. That is, motivational frames supply the impetus for public actions that go beyond diagnosis and prognosis, and include compelling vocabularies of severity, urgency, efficacy, and propriety. To engage the public in solving social problems, organizations need to establish the severity of a particular situation, emphasize a sense of urgency of the threat, stress the likelihood of change or efficacy of taking actions, or highlight moral responsibility. This process occurs within a multi-organizational realm that includes opponents, audiences, media, bystanders, and the organization itself.

Principles of the present disclosure illustrate that messages encouraging collective action are most effective when they combine these three types of frames. A story combining problem, solution, and motivation touches all the elements of the narrative arc, and is therefore more likely to be perceived as coherent. Separating these elements in different messages relies on the audience to integrate them from different sources, a process vulnerable to effects of memory and involvement.

Figure 5D:
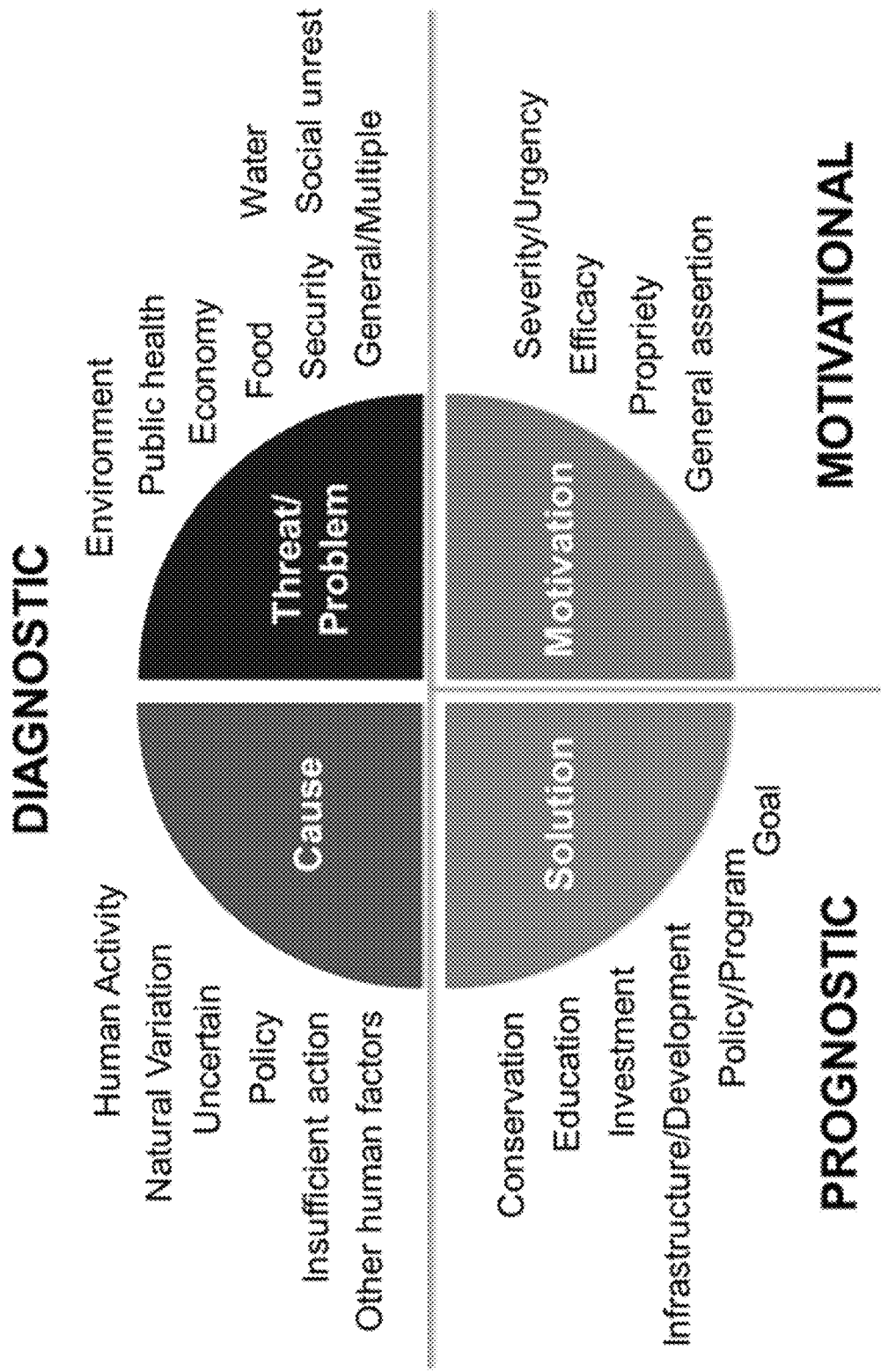
FIG. 5D illustrates an exemplary four-class typology according to an exemplary embodiment.

Prior approaches developed a four-class typology of climate change framing to capture three functions: diagnostic, prognostic, and motivational. FIG. 5D provides an overview of an exemplary four-class typology. Exemplary methods split the diagnostic frame into two sub-classes, cause and problem/threat to capture the special diagnostic attention paid to causes in the climate change debate. Though West African discourse is likely different from Western discourse in this regard, singling out cause framing for special attention provides maximum applicability of the four-class typology to other geographic contexts, and maintains a future basis for comparative analysis.

N-Gram Features. Exemplary systems and methods are configured to assess both uni-gram and bi-gram features. In one method, a simple term frequency-inverse document frequency (TF-IDF) based technique may be applied to the entire corpus to generate a large ranked list of, stopword eliminated, uni-grams and bi-grams. These materials may be utilized separately as features in exemplary learning models of system and method 500.

Generalized Concepts Feature. Prior approaches extracted concepts from paragraphs where only 40% of the paragraphs generated concepts. In contrast, exemplary systems and methods work at the sentence level, improving the concept extraction approach, by extracting more triplets by utilizing a larger number of triplet extractors and pre-processing their output to include about 80% of the sentences in the corpus.

Triplets Extraction. In order to extract Subject,Verb,Object triplets, an exemplary system runs a pronoun resolver. Any suitable resolver may be utilized, for example ClearNLP, Reverb, Everest, AlchemyAPI, and/or the like. Additionally, any triplet slots with phrases may be segmented into keywords, stemmed, stop-word removed and their cartesian products may be produced as additional triplets.

Concepts Generation. Triplets extraction algorithms typically produce noisy and sparse triplets. Therefore, the exemplary system applies a hierarchical bottom-up clustering algorithm that generalizes triplets into more meaningful relationships. To do so, the system employs both syntactic and semantic criteria that are based on the corpus to generalize triplets into high-level concepts without drift. In syntactic criteria, a pair of subjects-verbs-objects are merged only if they share common context related to their different arguments (i.e. a pair of different subjects are merged only if they co-occur with an identical verb-object context).

Additionally, the system captures contextual synonyms for subjects, verbs and objects by defining a semantic criterion which is based on the corpus as well as WordNet. Corpus-based contextual synonyms for subjects, verbs and objects is based on their common verb-object, subject-object and subject-verb contexts respectively. Also, the system captures contextual synonyms that are not derivable from the corpus by applying WordNet synonyms and hyponyms on the members of the concepts to further expand and generalize them.

In order for the information to propagate between clusters of subjects/objects and clusters of relations, the system applies a hierarchical bottom-up clustering algorithm. High-level concepts and relations are merged to form clusters. Each cluster is represented by a graph of nodes and edges where nodes represent concepts and edges represent relations between concepts.

Unsupervised Frame Learning. Unsupervised learning aims to draw inferences from a given dataset where labels (i.e. classes) are hidden or unknown. It focuses on how the model can learn to represent particular input patterns in a way that reflects the statistical structure of the dataset. The exemplary system utilizes this approach to assist in benchmarking different features: generalized concepts, uni-grams and bi-grams in the clustering process. In an unsupervised learning, comparing different features sets gives insight about the best feature set to be used in a classification task. Additionally, unsupervised learning facilitates determining whether the rational and theoretical background for the development of four-frame categories aligns with the dataset or not. In an exemplary embodiment, the system utilizes k-means to cluster the entire dataset into two clusters to see if they form Frame/Non-Frame clusters, and then the Frame sentences are clustered into four clusters mimicking the four-frame categories {Solution, Problem/Threat, Cause, and Motivation}.

Supervised Frame Learning. To classify each sentence as Frame/Non-Frame and identify its relevant frame category, the system utilizes a sparse learning framework, with the underlined motivation to select a subset of discriminating concepts that can (1) identify sentences containing frame references and (2) classify a sentence into a frame category. The following steps describe an exemplary algorithm: (i) Generate features from the entire corpus; (ii) Filter the features×sentences matrix to include only resultant generalized concepts/features; and (iii) Formulate the problem in a general sparse learning framework.

In particular, the logistical regression formulation presented below may be utilized by the exemplary system, since it is a dichotomous frame classification problem (i.e. each sentence classified as Frame/Non-Frame), and multi-class classification problem (i.e. each Frame sentence is further classified as one of four frames {Solution, Problem/Threat, Cause, and Motivation}):

$$\min_x \sum_{i=1}^{m} w_i \log(1 + \exp(-y_i(x^t a_i + c))) + \lambda |x| \quad \text{(Equation 2)}$$

In Equation 2, $a_i$ is the vector representation of the $i^{th}$ sentence, $w_i$ is the weight assigned to the $i^{th}$ sentence ($w_i=1/m$ by default), and $A=[a_1, a_2, \ldots, a_m]$ is the features×sentences matrix, $y_i$ is the label of each sentence, and the $x_j$, the $j^{th}$ element of x, is the unknown weight for each feature, ($\lambda>0$) is a regularization parameter that controls the sparsity of the solution, $|x|_1=\Sigma|x_i|$ is 1-norm of the x vector. The system may utilize the SLEP sparse learning package that utilizes gradient descent approach to solve the above convex and non-smooth optimization problem. The features with non-zero values on the sparse x vector yield the discriminant factors for classifying a sentence.

Experimental Evaluation

Sentence Annotation

Experts have developed four categories of climate change related frames as follows:

Solution Framing (Prognostic): Covering the prognostic function of defining what should be done about problems, solution framing refers to actions taken to prevent further impact of climate change effects or further impact of the causes of climate change such as greenhouse gas emissions. Solutions can also emphasize ongoing measures to deal with existing effects of climate change. Six frames capture an array of mitigation and adaptation efforts: conservation, education, investment, infrastructure and development, creation or implementation of policy and programs, and goal.

Problem Threat Framing (Diagnostic): This diagnostic framing class stresses on how climate change or outcomes of climate change impact various actors, industries, human health, and the environment, Eight codes capture negative consequences and threats brought by climate change, including environmental systems and ecosystem, public health, economic development, food security, water scarcity, national security, social unrest, and general or multiple impacts.

Both cause framing and problem/threat framing comprise the diagnostic function in defining social problems.

Cause Framing: This group of diagnostic frames focus on attributing the blame for causing climate change to either human activity, natural variation or other reasons. Six sub-categories captured different explanations for causal attribution of climate change: (a) human activity, (b) natural variation, (c) scientific uncertainty, (d) policy causes, (e) insufficient actions, and (f) human disruption to mitigate climate change impact.

Motivation Framing (Motivational): Motivational framing refers to statements that explicitly call for definitive course(s) of action and explain why the audience should make an effort to enact solutions. In other words, motivational frames elaborate on the rationale for action that goes beyond diagnosis and prognosis, and include vocabularies of severity, urgency, efficacy, and propriety. In some exemplary embodiments, the system also utilizes a general category to analyze statements that call for actions without providing readers with above-mentioned reasons.

In one assessment, the system utilized sentence annotation via three different expert coders where ties were broken by using the majority vote.

TABLE 3

| Method | SSE | Purity |
|---|---|---|
| Concepts | 54,322.08 | 0.91 |
| Bi-grams | 720,044.21 | 0.71 |
| Uni-grams | 306,124.03 | 0.68 |

Quantitative Evaluation

Unsupervised Learning. Experimenting with unsupervised learning reveals dataset structure and can infer relations among data points. In an exemplary method, the system ignored labels and clustered the dataset using three sets of features (i.e. uni-gram keywords, bi-gram terms, and generalized concepts) separately as features and via use of the k-means as clustering algorithm. In one evaluation, the system utilized k=2 for the entire dataset, and k=4 for the Frame sentences. To evaluate k-means clustering results, the system utilized SSE (sum of squared error) as well as purity.

Table 3 shows the SSE and purity for clustering the entire dataset into two clusters using different features. Using generalized concepts as features, the resultant SSE (54,322.08) and purity (0.91) outperform those ones with uni-grams SSE (306,124.03) and purity (0.68) as well as bi-grams SSE (720,044.21) and purity (0.71).

TABLE 4

| Method | SSE | Purity |
|---|---|---|
| Concepts | 34,397.75 | 0.98 |
| Bi-grams | 139,124.43 | 0.91 |
| Uni-grams | 292,812.30 | 0.51 |

Table 4 presents the SSE and purity for clustering the frame sentences into four clusters using different features. Using generalized concepts as features, the resultant SSE (34,397.75) and purity (0.98) outperform those ones with uni-grams SSE (292,812.30) and purity (0.51) as well as bi-grams SSE (139,124.43) and purity (0.91).

Figure 5E:
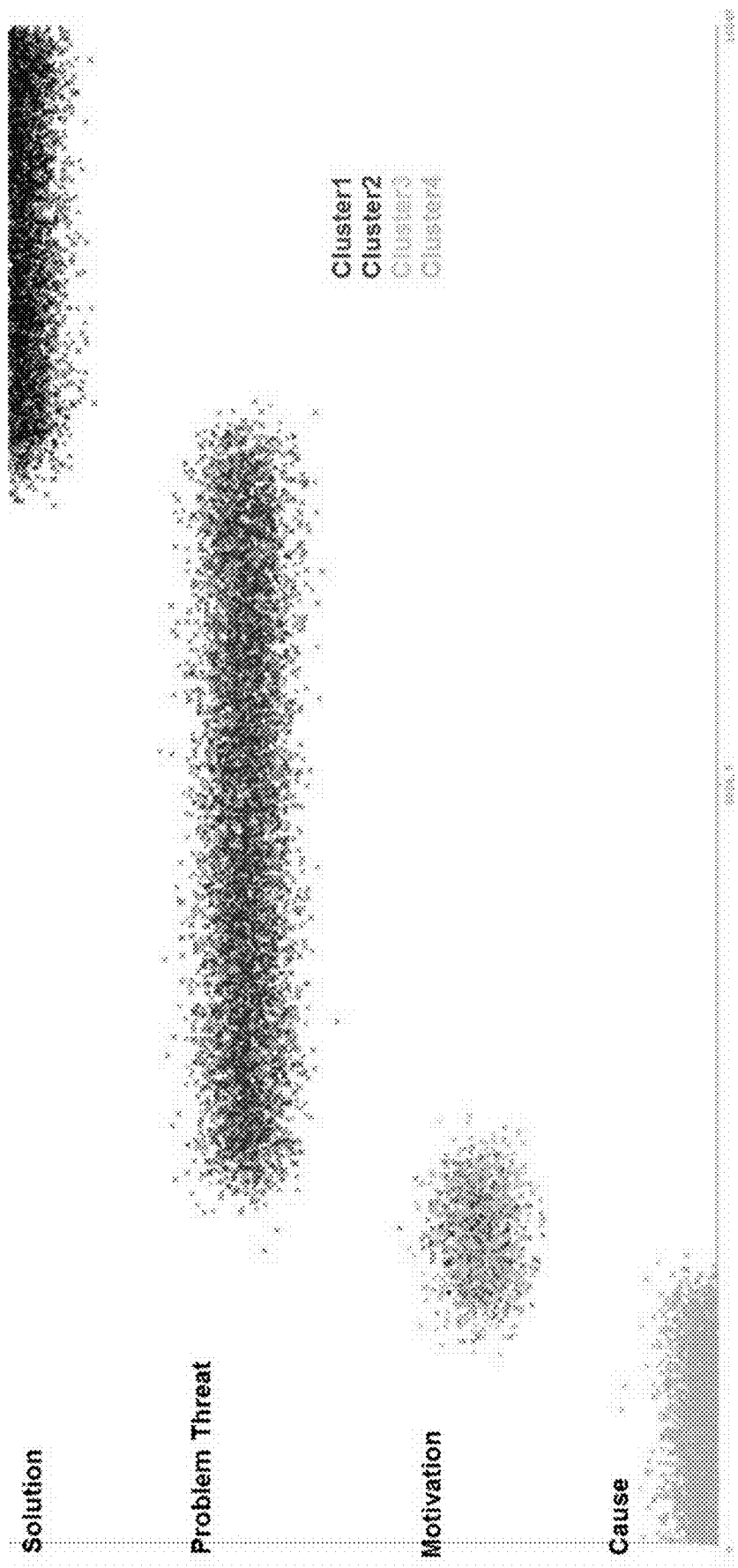
FIG. 5E illustrates clustering of frame sentences into clusters utilizing concepts according to an exemplary embodiment.
Figure 5F:
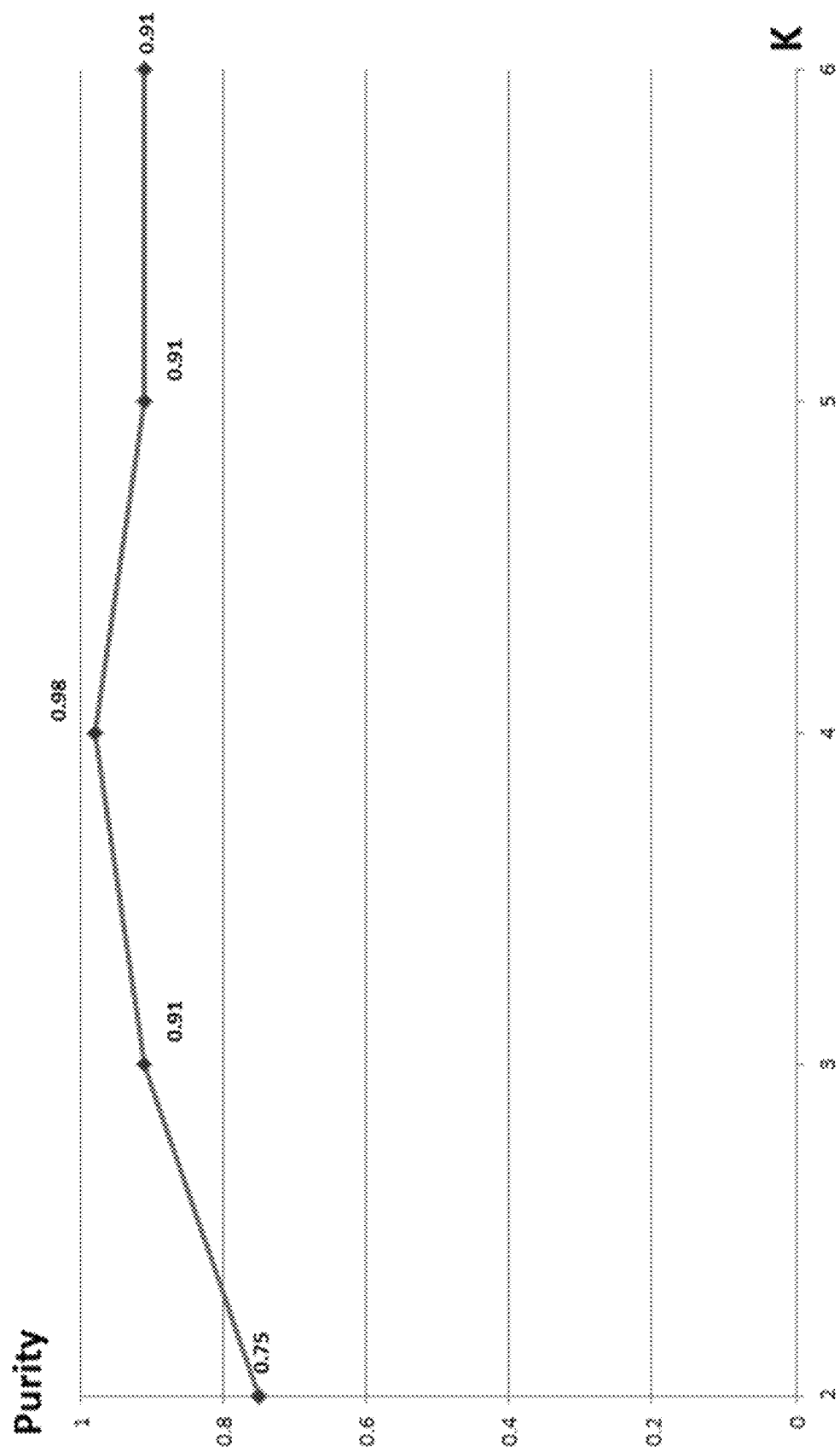
FIG. 5F illustrates results for different numbers of clusters according to an exemplary embodiment.

FIG. 5E shows the resultant clusters of frame sentences using concepts as features. In this figure we have the ground truth (i.e. which sentence belongs to which frame category) by using sentence id in x-axis and the corresponding frame category in y-axis. The three clusters (1,2,3) corresponding to frames (Solution, Problem/threat, and Cause) are well clustered in terms of purity. The Motivation frame (cluster 4 next to Motivation) is mixed of the other three clusters (1,2,3). A reasonable inference for this impurity is that in motivational framing, typically people show the cause of a problem and propose a solution. As a result, a sentence that belongs to motivation frame category could carry other frame categories (Solution, Problem/threat, and Cause). FIG. 5F shows the purity for experimenting different K values (i.e. number of clusters), using concepts as features on the Frame sentences. In this figure, the highest purity is 0.98 when K=4 which aligns with the development of the four frame categories {Solution, Problem Threat, Cause, and Motivation} discussed hereinabove.

Supervised Learning. In this approach, the exemplary system utilizes a labeled dataset. Once sentences are labeled as Frame/Non-Frame and categorized with their corresponding frame category, the system utilizes uni-gram keywords, bi-gram terms, and generalized concepts separately as features and the sparse logistic regression classifier SLEP to identify weighted discriminative features and classify sentences. Other classifiers, such as SVM or Random Forests, may alternatively be utilized. Using different types of features generated from the entire corpus, the system performed ten-fold cross-validation for measuring the classifier's predictive accuracy to detect Frame/Non-Frame sentences. Next, using features generated from frame sentences only, the system trained a multi-class model to classify sentences into their corresponding frame category. The system utilizes precision, recall, and F-measure as quantitative evaluation metrics. Qualitative analysis of the identified discriminating concepts is discussed below.

TABLE 5

| Method | Class Label | Precision | Recall | F-measure |
|---|---|---|---|---|
| Concepts | Frame | 0.80 | 0.88 | 0.84 |
| | Non Frame | 0.87 | 0.77 | 0.82 |
| | Average | 0.83 | 0.83 | 0.83 |
| Bi-grams | Frame | 0.75 | 0.42 | 0.54 |
| | Non Frame | 0.74 | 0.92 | 0.82 |
| | Average | 0.74 | 0.67 | 0.68 |
| Uni-grams | Frame | 0.75 | 0.48 | 0.59 |
| | Non Frame | 0.76 | 0.91 | 0.89 |
| | Average | 0.75 | 0.70 | 0.74 |

Table 5 presents the accuracies for detecting Frame/Non-Frame sentences using different features. Using generalized concepts approach as features, the resultant average accuracy (F-measure of 83%) outperforms both accuracies with uni-grams (74%) and bi-grams (68%) features by 12% and 22% respectively.

TABLE 6

| Method | Frame Category | Precision | Recall | F-measure |
|---|---|---|---|---|
| Concepts | Solution | 0.75 | 0.93 | 0.83 |
| | Problem Threat | 0.77 | 0.84 | 0.79 |
| | Cause | 0.85 | 0.77 | 0.80 |
| | Motivation | 0.89 | 0.62 | 0.73 |
| | Average | 0.82 | 0.79 | 0.79 |
| Bi-grams | Solution | 0.87 | 0.77 | 0.81 |
| | Problem Threat | 0.84 | 0.77 | 0.80 |
| | Cause | 0.86 | 0.73 | 0.76 |
| | Motivation | 0.90 | 0.58 | 0.71 |
| | Average | 0.87 | 0.71 | 0.77 |

TABLE 6-continued

| Method | Frame Category | Precision | Recall | F-measure |
|---|---|---|---|---|
| Uni-grams | Solution | 0.78 | 0.87 | 0.82 |
| | Problem Threat | 0.81 | 0.81 | 0.81 |
| | Cause | 0.83 | 0.62 | 0.82 |
| | Motivation | 0.85 | 0.57 | 0.64 |
| | Average | 0.82 | 0.72 | 0.77 |

Table 6 shows the accuracies for identifying the corresponding frame category. Using generalized concepts, these accuracies vary between 73% and 83% (F-measure) for different categories. In this table, utilizing generalized concepts yields slightly better performance compared to both uni-grams and bi-grams with an overall average accuracy (F-measure) of 79%.

TABLE 7

| Cause | Problem Threat | Solution | Motivation |
|---|---|---|---|
| {Greenhouse, Emissions, Gases} ↓ | {Flood} ↓ | {Action plan, Policy} ↓ | {International, Community} ↓ |
| {Cause, Attribute to} ↓ | {Associate, Create} ↓ | {Build, Consolidate} ↓ | {Urge, Warn} ↓ |
| {Global warming} | {Poverty, Disease} | {Sustainability, Resilience future} | {Threat} |
| {Industry, Anthropogenic} ↓ | {Heavy rainfall, Torrential rain} ↓ | {Development, Sustainability, National program} | {Agreement, Leaders, World} ↓ |
| {Raise} ↓ | {Create, Bring, Increase} ↓ | ↓ {Enhance} | {Help} ↓ |
| {Earth temperature, CO2, CO5} | {Flooding, Disaster, Landslide} | ↓ {Community} | {Future, Hope} |
| {Fossil fuel} ↓ | {Drought} ↓ | {Brown} ↓ | {USA, EU, China} ↓ |
| {Impact, Harm} ↓ | {Cause, Impact, Reduce} ↓ | {Sign} ↓ | {Recognize, Reduce} ↓ |
| {Planet, Environment, Weather} | {flood-shortage, Food-production, Crop} | {Local legislation, CA groundwater, Management framework} | {Emissions} |
| {Coal combustion, Diesel, Man-Made} ↓ | {Sea-level rise} ↓ | {Sustainability, Energy} ↓ | {Africa} ↓ |
| {Create} ↓ | {Result in, Cause} ↓ | {Can help, Improve} ↓ | {Need, Implement} ↓ |
| {Extreme weather, Temperature-up} | {Tsunami, Damage, Food} | {Food security, Households} | {Policy, Awareness, Partnership} |
| {Truck, Car} ↓ | {Extreme Weather, Hailstorm} ↓ | {Smart, agriculture, Africa countries} | {Nigerian} ↓ |
| {Rise} ↓ | {Cause, Affect} ↓ | {Meet, Breathe} ↓ | {Apply, Take} ↓ |
| {Carbon pollution, Pollute} | {Mudslide, Floods, Farming} | {Life} | {Measures, Renewable Energy, Policy} |

Qualitative Analysis of Resultant Concepts. Table 7 shows the top five discriminative concepts for each frame category. A team of experts explored the highly significant generalized concepts germane to four-class framing in media discourse surrounding climate change across West African RSS feeds and provided qualitative evaluations as follows:

Cause Framing. Causal responsibility of climate change and its effects was often attributed to anthropogenic activities, particularly man-made greenhouse gas emissions, human-induced pollution, and fossil fuel use. Carbon dioxide and greenhouse gas emission emerged as highly significant concepts, as indicated by high weigh value. Media texts often associated global warming with carbon dioxide emissions using the following triplets to construct a cohesive story: (i) Scientific research indicates that atmospheric carbon dioxide is increasing at a large level; and (ii) Cars and trucks were major sources of air pollution and carbon dioxide emissions, which directly increased local temperature.

Problem/Threat Framing. Next, the system may be utilized to identify the dominant concepts representing the problem and threat framing of climate change. Media texts tended to highlight devastating environmental impacts caused by climate change, such as floods, prolonged drought, loss of landmass and soil, desertification, sea-level rise, storm surge, heat waves, and more. Flooding, in particular, is a severe concern as nine out of sixteen triplets of high weigh values explicitly mentioned the negative impacts of heavy rainfall or torrential rain. Consequently, economic condition and food insecurity were influenced, infrastructure was damaged, and health diseases were exacerbated with the increased intensity and frequency of floods.

Motivation Framing. When discussing motivation for why policy actors and citizens should act upon, the most salient concepts emphasized that international communities (e.g. U.S., EU, and China) should negotiate a legal agreement to reduce greenhouse gas emissions at the end of 2015. There is little attention to stating specific reasons for offering localized adaptation strategies that people can undertake. Although the awareness of climate change impacts among African government officials was generally high, the prevailing generalized concept of calling for international actions on mitigation from mainstream media discourse reflected a lack of effective national and local policies.

Figure 5G:
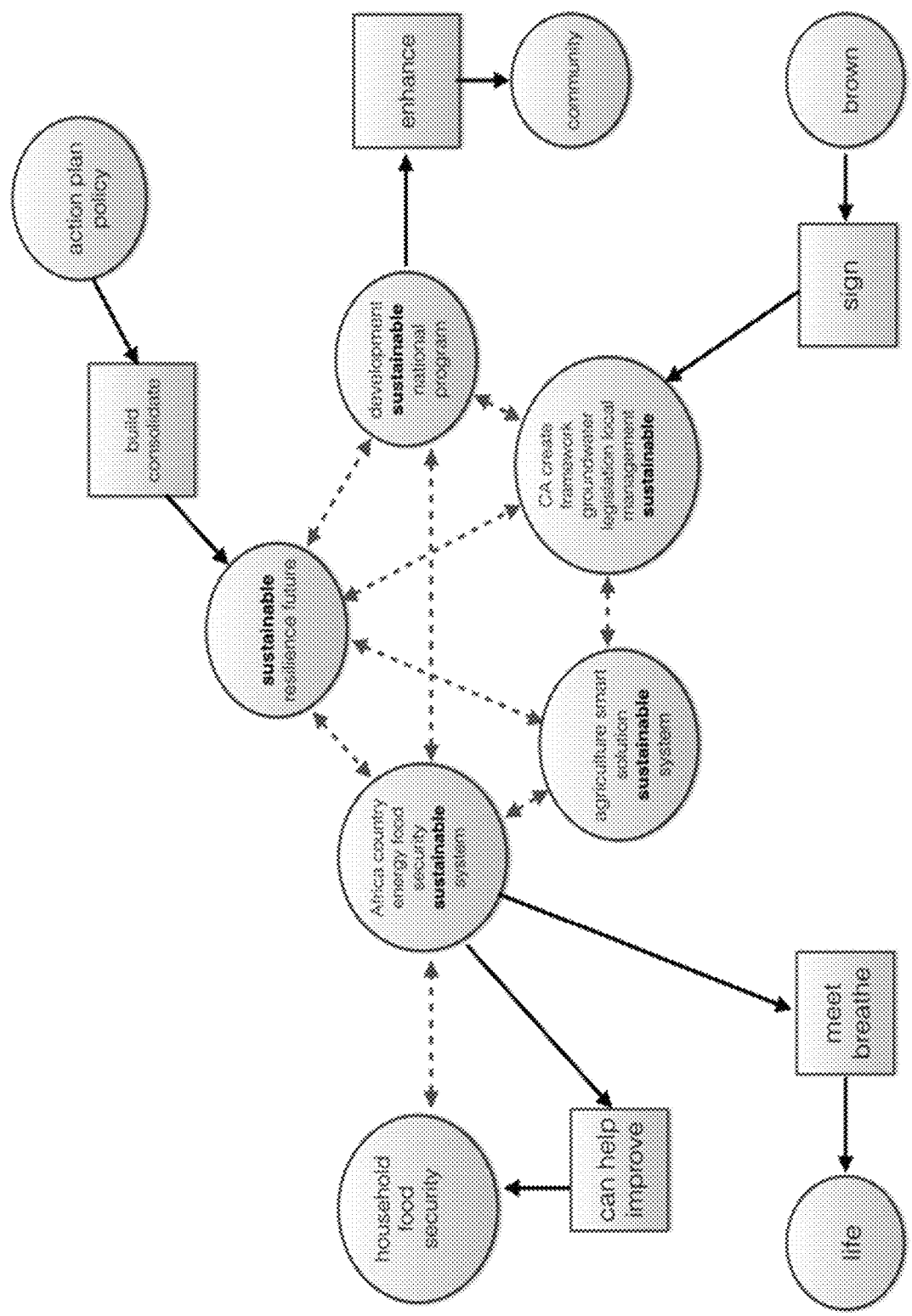
FIG. 5G illustrates an exemplary semantic network of frame concepts arising from application of an exemplary method according to an exemplary embodiment.

Visualizing Concepts. To visualize the generalized concept and relation clusters, the system utilizes a semantic network of nodes (V) and edges (E) to describe the semantic space of the underlying texts. Circle nodes represent subjects/objects and square nodes represent verbs. Edges represent relations between concepts. In such a network, distinct combinations of actors (subjects) perform or recommend various sets of actions (verbs) on distinct combinations of targets (objects). The exemplary semantic network illustrated in FIG. 5G illustrates how sustainability emerges as a concept that is central to addressing climate change impacts. The semantic network represents the contextual relationships between generalized triplets relating to strategies for sustainable adaptation. In the media discourse, sustainable adaptation is predominantly framed as an effective solution to reduce impacts of climate change and contribute to social, economic, and environmental development. As shown in FIG. 5G, developing sustainable national programs (or actions) can enhance local community resilience. According to the IPCC (Intergovernmental Panel on Climate Change) report, the majority of rural communities rely on rain-fed agriculture to sustain their livelihoods in West Africa, the region worst affected by climate change. With changing rainfall patterns, prolonged droughts and flooding, sustainable system of developing agriculture-smart technologies can help improve food security at the household level. Interestingly, the African media discussed that California Governor Jerry Brown has signed the most significant framework for regulating underground water resources to achieve sustainable development in September, 2014.

Climate change framing has pervasive influence, and the exemplary system and method 500 presents a new computational approach based on generalized concepts to identify popular media frames and map them to different categories: solution, problem/threat, cause, and motivation. The exemplary system develops a new type of textual features that generalize (subject,verb,object) triplets extracted from text, by clustering them into high-level concepts. Compared to uni-gram and bi-gram based models, frame classification and clustering using the exemplary generalized concepts yielded better discriminating features with a 12% boost in accuracy (i.e. from 74% to 83% in f-measure) and 0.91 clustering purity for Frame/Non-Frame detection. It will be appreciated that utilizing discriminating generalized concepts indicating actor-action-target sequences to infer causal chains of events, frames, and actions can lead to better indicators of climate-change related social unrest.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection.

When language similar to "at least one of A, B, or C" or "at least one of A, B, and C" is used in the claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for story form detection in a corpus, the method comprising:
   preprocessing, in an electronic dataset comprising a plurality of paragraphs and by a story form detection system operative on a computer optimized for story form detection, each paragraph to prepare the paragraphs for feature extraction;
   generating, from the dataset and by the story form detection system, a uni-gram feature set for the plurality of paragraphs;
   generating, from the dataset and by the story form detection system, a bi-gram feature set for the plurality of paragraphs;
   generating, from the dataset and by the story form detection system, a generalized concepts/relations feature set for the plurality of paragraphs;
   creating, by the story form detection system, a feature matrix for the uni-gram feature set;
   creating, by the story form detection system, a feature matrix for the bi-gram feature set;
   creating, by the story form detection system, a binary feature matrix for the generalized concepts/relations feature set; and
   co-clustering, by the story form detection system and via an algorithm, the uni-gram feature set, the bi-gram feature set, and the generalized concepts/relations feature set into a set of clusters, wherein the co-clustering comprises:
      utilizing a t-distributed stochastic neighbor embedding technique to visualize block diagonal sub-structures in the feature sets, and
      selecting, in the feature sets, a number of clusters between two and fourteen, the number of clusters configured to generate the highest variance ratio criterion among the possible number of clusters.

2. The method of claim 1, wherein the co-clustering utilizes non-negative matrix factorization.

3. The method of claim 1, wherein the preprocessing comprises determining, by the story form detection system, if a paragraph in the plurality of paragraphs comprises a story.

4. The method of claim 1, further comprising generating, by the story form detection system, block diagonal sparsity structures for the feature sets by reordering indices for the feature sets in each row and column for each cluster in the set of clusters; and displaying, on a computer system display associated with the story form detection system, the block diagonal sparsity structures.

5. The method of claim 1, further comprising utilizing the set of clusters to generate a set of counter-narratives targeted to each cluster in the set of clusters.

6. The method of claim 5, further comprising disseminating, via at least one media channel, the set of counter narratives.

7. The method of claim 1, wherein the co-clustering algorithm utilizes a syntactic criterion and a semantic criterion.

8. A method for story form detection in a corpus, the method comprising:
   preprocessing, in an electronic dataset comprising a plurality of paragraphs and by a story form detection system operative on a computer optimized for story form detection, each paragraph to prepare the paragraphs for feature extraction;
   generating, from the dataset and by the story form detection system, a uni-gram feature set for the plurality of paragraphs;
   generating, from the dataset and by the story form detection system, a bi-gram feature set for the plurality of paragraphs;
   generating, from the dataset and by the story form detection system, a generalized concepts/relations feature set for the plurality of paragraphs;
   creating, by the story form detection system, a feature matrix for the uni-gram feature set;
   creating, by the story form detection system, a feature matrix for the bi-gram feature set;
   creating, by the story form detection system, a binary feature matrix for the generalized concepts/relations feature set;
   co-clustering, by the story form detection system and via an algorithm, the rani-gram feature set, the bi-gram feature set, and the generalized concepts/relations feature set into a set of clusters;
   generating, by the story form detection system, block diagonal sparsity structures for the feature sets by reordering indices for the feature sets in each row and column for each cluster in the set of clusters; and
   displaying, on a computer system display associated with the story form detection system, the block diagonal sparsity structures.

9. The method of claim 8, wherein the co-clustering utilizes non-negative matrix factorization.

10. The method of claim 8, wherein the preprocessing comprises determining, by the story form detection system, if a paragraph in the plurality of paragraphs comprises a story.

11. The method of claim 8, wherein the co-clustering comprises:
   utilizing a t-distributed stochastic neighbor embedding technique to visualize block diagonal sub-structures in the feature sets; and
   selecting, in the feature sets, a number of clusters between two and fourteen, the number of clusters configured to generate the highest variance ratio criterion among the possible number of clusters.

12. The method of claim 8, wherein the set of clusters comprises at least two clusters and less than 14 clusters.

13. The method of claim 8, further comprising utilizing the set of clusters to generate a set of counter-narratives targeted to each cluster in the set of clusters.

14. The method of claim 13, further comprising disseminating, via at least one media channel, the set of counter narratives.

15. The method of claim 8, wherein the co-clustering algorithm utilizes a syntactic criterion and a semantic criterion.

* * * * *